US012731938B2

(12) United States Patent
Ito

(10) Patent No.: US 12,731,938 B2
(45) Date of Patent: Sep. 8, 2026

(54) COVERED CONNECTOR, ELECTRONIC UNIT, AND CONNECTOR UNIT

(71) Applicant: SUMITOMO WIRING SYSTEMS, LTD., Mie (JP)

(72) Inventor: Toshihiro Ito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 349 days.

(21) Appl. No.: 18/690,145

(22) PCT Filed: Aug. 30, 2022

(86) PCT No.: PCT/JP2022/032499

§ 371 (c)(1),
(2) Date: Mar. 7, 2024

(87) PCT Pub. No.: WO2023/042651

PCT Pub. Date: Mar. 23, 2023

(65) Prior Publication Data

US 2024/0380157 A1 Nov. 14, 2024

(30) Foreign Application Priority Data

Sep. 17, 2021 (JP) ................................ 2021-151967

(51) Int. Cl.

*H01R 13/518* (2006.01)
*H01R 13/506* (2006.01)
*H01R 13/629* (2006.01)

(52) U.S. Cl.

CPC ......... *H01R 13/518* (2013.01); *H01R 13/506* (2013.01); *H01R 13/62938* (2013.01)

(58) Field of Classification Search

CPC ................ H01R 13/518; H01R 13/506; H01R 13/62938

(Continued)

(56) References Cited

U.S. PATENT DOCUMENTS 5,295,859 A * 3/1994 Kawai .................. H01R 13/506 439/447
5,378,173 A * 1/1995 Hashizawa .......... H01R 13/506 439/364

(Continued)

FOREIGN PATENT DOCUMENTS

JP H11-040239 A 2/1999
JP 2005-310436 A 11/2005
JP 2016-091677 A 5/2016

OTHER PUBLICATIONS

International Search Report issued on Oct. 18, 2022 for WO 2023/042651 A1 (4 pages).

*Primary Examiner* — Harshad C Patel
(74) *Attorney, Agent, or Firm* — Venjuris, P.C.

(57) ABSTRACT

A covered connector includes housings that are disposed so as to be aligned, and a first wire cover, a second wire cover, and a third wire cover that are attached to the housings. The first wire cover, the second wire cover, and the third wire cover include a first wire exit port, a second wire exit port, and a third wire exit port that are open in the same direction. The second electric wire exit port and the third electric wire exit port are disposed so as to be displaced with respect to the first wire exit port in the mating direction of the housings. The second wire exit port and the third wire exit port are disposed so as to be displaced in a different direction from both the mating direction of the housings and the direction in which the housings are aligned.

6 Claims, 26 Drawing Sheets

(58) Field of Classification Search
USPC .......................................................... 439/626
See application file for complete search history.

(56) References Cited

U.S. PATENT DOCUMENTS 5,567,182 A * 10/1996 Ishii .................... H01R 13/514 439/364
5,735,702 A * 4/1998 Hio .................. H01R 13/62955 439/468
5,947,762 A * 9/1999 Katsuma ............ H01R 13/5213 439/468
6,736,651 B2 * 5/2004 Ho ....................... H01R 12/725 439/541.5
7,384,285 B2 * 6/2008 Patterson ......... H01R 13/62955 439/372
9,924,620 B2 * 3/2018 Kodama ................ H01R 27/02
10,141,681 B2 * 11/2018 Shindo ............... H01R 13/5219
10,249,978 B2 * 4/2019 Dean .................... H01R 13/514
10,553,983 B2 * 2/2020 Mito ...................... H01R 13/50
10,855,022 B2 * 12/2020 Komori .............. H01R 13/5213
11,211,752 B2 * 12/2021 Ohtaka ................ H01R 13/641
11,502,441 B1 * 11/2022 Tang .................... H01R 13/113
12,334,677 B2 * 6/2025 Mizutani ............ H01R 13/6295
12,414,263 B2 * 9/2025 Yang .................. H05K 7/20254
12,431,666 B2 * 9/2025 Nielsen ................ H01R 13/631
12,482,974 B2 * 11/2025 Lu .......................... H01R 12/79
2006/0281350 A1 * 12/2006 Yamamoto ........... H01R 13/516 439/157
2010/0055983 A1 * 3/2010 Wu ........................ H01R 27/00 439/626
2011/0021058 A1 * 1/2011 Todo ................ H01R 13/62944 439/345
2011/0070763 A1 * 3/2011 Kobayashi ......... H01R 13/6295 439/345
2012/0028487 A1 * 2/2012 Suemitsu ............... H01R 13/46 439/157
2012/0178300 A1 * 7/2012 Yoshioka ............... H01R 4/023 439/626
2014/0038466 A1 * 2/2014 Karodi ................. H01R 13/514 439/626
2014/0370759 A1 * 12/2014 Tai ....................... H01R 12/724 439/629
2016/0322746 A1 * 11/2016 Sasaki .................. H01R 13/502
2018/0005726 A1 * 1/2018 Hiramitsu .............. H01B 3/308
2023/0062271 A1 * 3/2023 Takahashi ........ H01R 13/62938
2025/0337196 A1 * 10/2025 Mase ............... H01R 13/62938

* cited by examiner

COVERED CONNECTOR, ELECTRONIC UNIT, AND CONNECTOR UNIT

CROSS REFERENCE TO RELATED APPLICATIONS

This application is a national phase of PCT application No. PCT/JP2022/032499, filed on 30 Aug. 2022, which claims priority from Japanese patent application No. 2021-151967, filed on 17 Sep. 2021, all of which are incorporated herein by reference.

TECHNICAL FIELD

The technology disclosed in the present specification relates to a covered connector, an electronic unit, and a connector unit.

BACKGROUND

A connector equipped with a first housing and a second housing, which are disposed so as to be aligned, and a wire cover that is attached to the two housings is known (see Patent Document 1). The wire cover includes a lower cover, which houses first wires that are led out from the first housing, and an upper cover, which is disposed so as to be stacked on the lower cover and houses second wires that are led out from the second housing. This wire cover enables the first wires and the second wires to be routed in a predetermined direction without interfering with each other.

PRIOR ART DOCUMENT

Patent Document

Patent Document 1: JP 2016-091677 A

SUMMARY OF THE INVENTION

Problems to be Solved

For a connector equipped with a plurality of housings and a wire cover as described above, if the number of housings is increased further, the size of the connector will tend to increase, and there are concerns that it will become difficult to reliably restrict the directions in which the wires are led out.

Means to Solve the Problem

A covered connector disclosed in the present specification includes: a first housing, a second housing, and a third housing that mate with a mating connector; electric wires that extend from the first housing, the second housing, and the third housing, respectively; and a first wire cover, a second wire cover, and a third wire cover that are respectively attached to the first housing, the second housing, and the third housing, and cover the electric wires, wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, and the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned.

Effect of the Invention

According to the covered connector, the electronic unit, and the connector unit disclosed in the present specification, it is possible to regulate a direction in which wires are led out while increasing miniaturization.

DETAILED DESCRIPTION TO EXECUTE THE INVENTION

Figure 1:
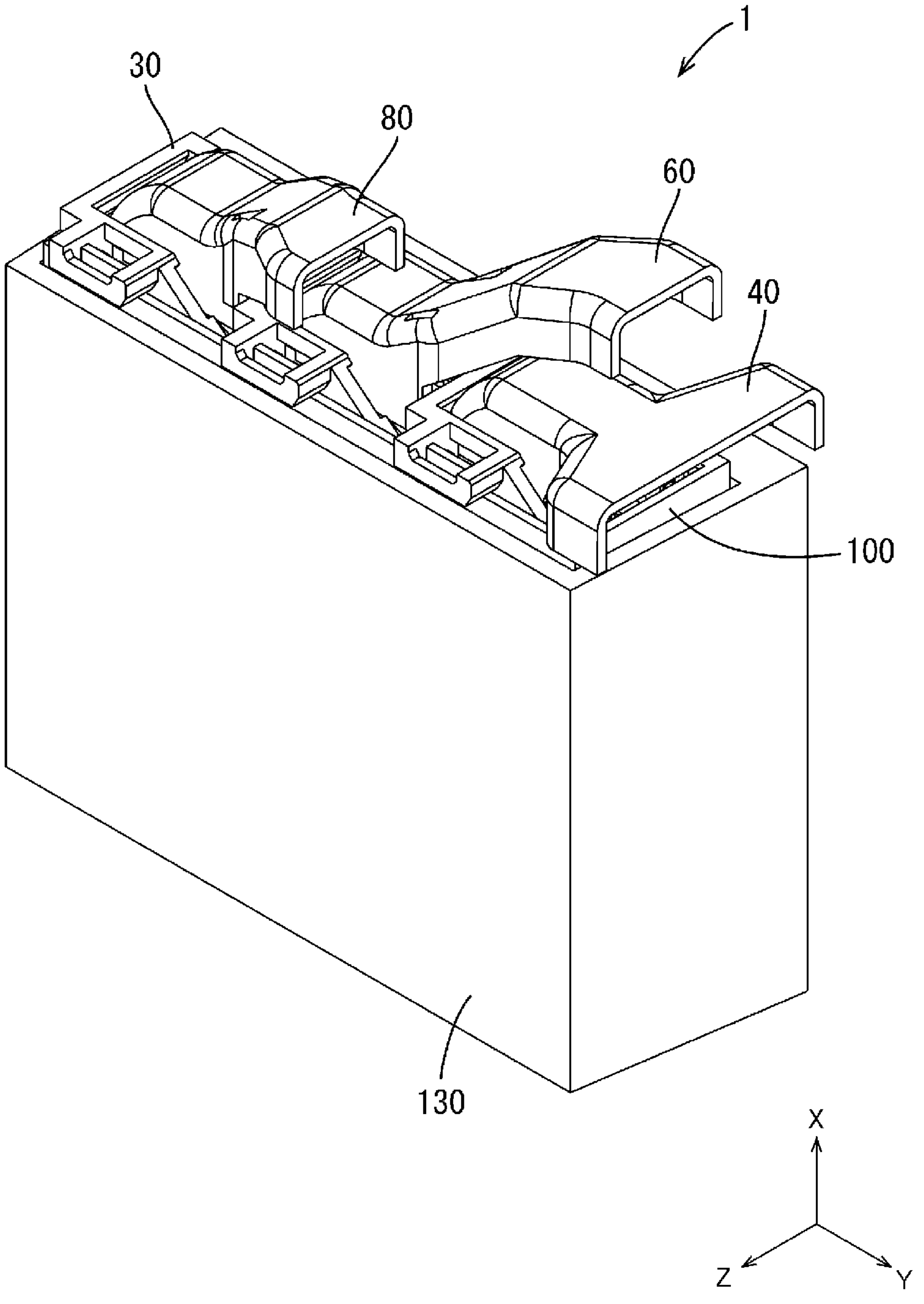
FIG. 1 is a perspective view of an electronic unit according to a first embodiment.

Outline of Embodiments of the Present Disclosure (1) A covered connector disclosed in the present specification includes: a first housing, a second housing, and a third housing that mate with a mating connector; electric wires that extend from the first housing, the second housing, and the third housing, respectively; and a first wire cover, a second wire cover, and a third wire cover that are respectively attached to the first housing, the second housing, and the third housing, and cover the electric wires, wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, and the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned.

According to the configuration described above, the electric wires can all be led out in the same direction while avoiding mutual interference. In addition, the three wire covers can be laid out compactly compared to when the first wire exit port, the second wire exit port, and the third wire exit port are arranged side by side in a line, which enables miniaturization.

(2) In the covered connector according to (1) described above, the first wire cover, the second wire cover, and the third wire cover may include a first wire restricting portion, a second wire restricting portion, and a third wire restricting portion that are adjacent to the first wire exit port, the second wire exit port, and the third wire exit port, and a width of the first wire restricting portion may be wider than a width of the second wire restricting portion and a width of the third wire restricting portion.

According to this configuration, the electric wires led out from the second wire cover and the third wire cover can be supported by the first wire restricting portion, which means that the electric wires can be stably routed.

(3) In the covered connector according to either (1) or (2) described above, the second wire exit port and the third wire exit port may be disposed so as to not overlap the first wire exit port along the mating direction in which the first housing, the second housing, and the third housing are mated to the mating connector.

Alternatively, in the covered connector according to either (1) or (2) described above, the second wire exit port and the third wire exit port may be disposed so as to not overlap each other along a direction that differs to both the mating direction in which the first housing, the second housing, and the third housing are mated to the mating connector and the direction in which the first housing, the second housing, and the third housing are aligned.

According to the above configuration, it is possible to avoid interference between wires led out from the three wire covers, and to stably route the wires.

(4) An electronic unit disclosed in the present specification includes: a covered connector including a first housing, a second housing, and a third housing, electric wires that extend from the first housing, the second housing, and the third housing, respectively, and a first wire cover, a second wire cover, and a third wire cover that are respectively attached to the first housing, the second housing, and the third housing, and cover the electric wires; a mating connector to which the first housing, the second housing, and the third housing are mated; a circuit board to which the mating connector is fixed; and a case that internally houses the circuit board and the mating connector, wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned, the case includes a first case wall, a second case wall that faces the first case wall, and a third case wall that includes a connector insertion opening, through which the mating connector is inserted, and connects the first case wall and the second case wall, and the first wire cover, the second wire cover, and the third wire cover are disposed between a first virtual plane including an outer surface of the first case wall and a second virtual plane including an outer surface of the second case wall.

According to the configuration described above, the three wire covers can be compactly laid out and an increase in the size of the electronic unit can be avoided.

(5) A connector unit disclosed in the present specification includes: a covered connector including a first housing, a second housing, and a third housing, electric wires that extend from the first housing, the second housing, and the third housing, respectively, and a first wire cover, a second wire cover, and a third wire cover that are respectively attached to the first housing, the second housing, and the third housing, and cover the electric wires; and a mating connector to which the first housing, the second housing, and the third housing are mated; wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned, and the first wire cover, the second wire cover, and the third wire cover are disposed between a third virtual plane and a fourth virtual plane, which are parallel to the mating direction in which the first housing, the second housing, and the third housing are mated to the mating connector and which respectively include a first end and a second end that protrude by a greatest amount on respective sides in a direction that differs to both the mating direction in which the first housing, the second housing, and the third housing are mated to the mating connector and the direction in which the first housing, the second housing, and the third housing are aligned.

According to the configuration described above, the three wire covers can be compactly laid out and an increase in the size of the connector unit can be avoided.

Detailed Description of Embodiments of the Present Disclosure

Specific examples of the technology according to the present disclosure are described below with reference to the drawings. Note that the present disclosure is not limited to these embodiments, is indicated by the range of the patent claims, and is intended to include all modifications within the meaning and scope of the patent claims and their equivalents.

First Embodiment

A first embodiment will now be described with reference to FIG. 1 to FIG. 23. An electronic unit 1 according to the present embodiment is an ECU (Electronic Control Unit) that is installed in a vehicle and controls various vehicle-mounted devices. The electronic unit 1 includes a connector unit 140, which is equipped with a covered connector 10 and a mating connector 100 that mates with the covered connector 10, a circuit board 120 to which the mating connector 100 is fixed, and a case 130 that internally houses the circuit board 120 and the mating connector 100.

[Covered Connector 10]

Figure 2:
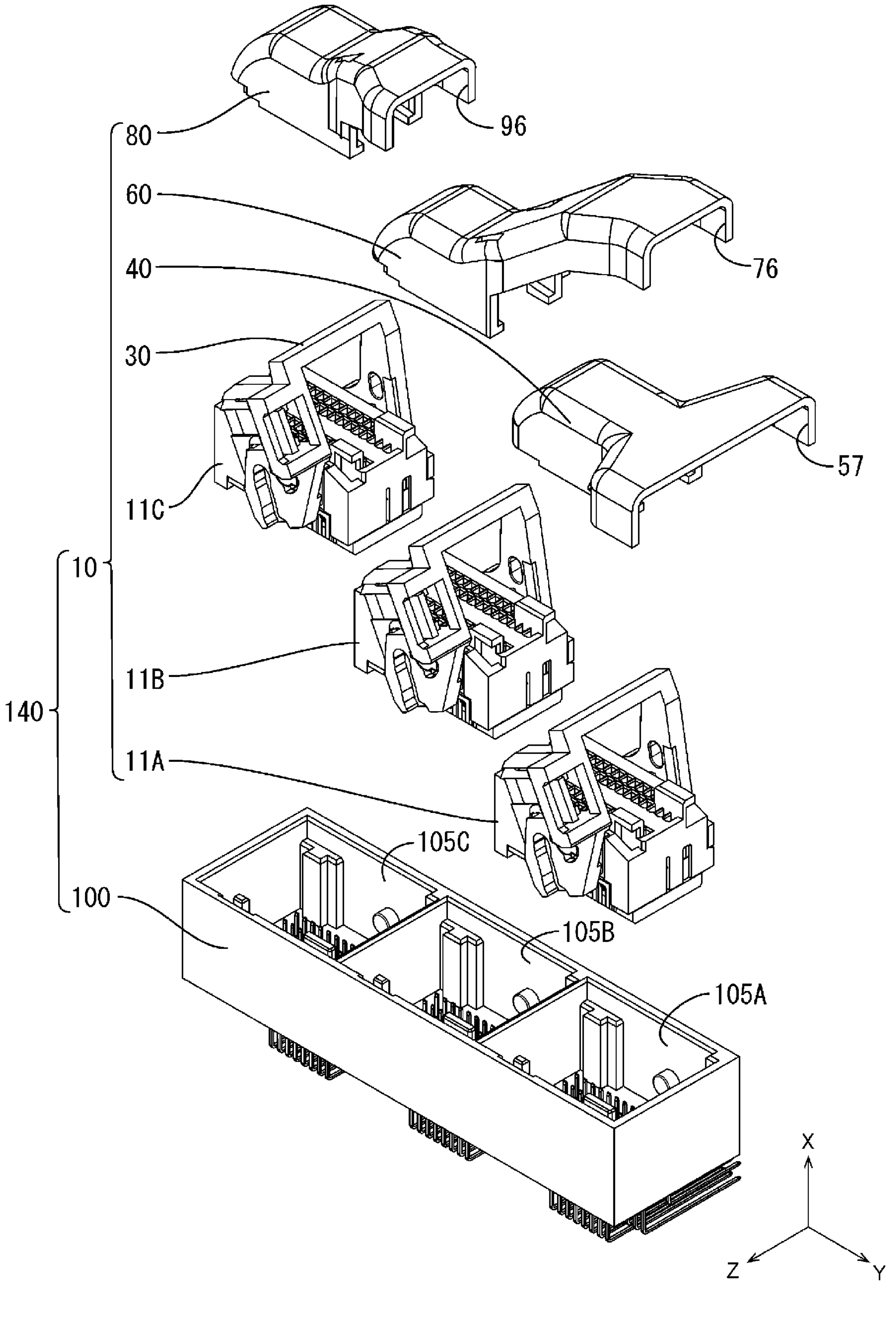
FIG. 2 is an exploded perspective view of a connector unit according to the first embodiment.
Figure 21:
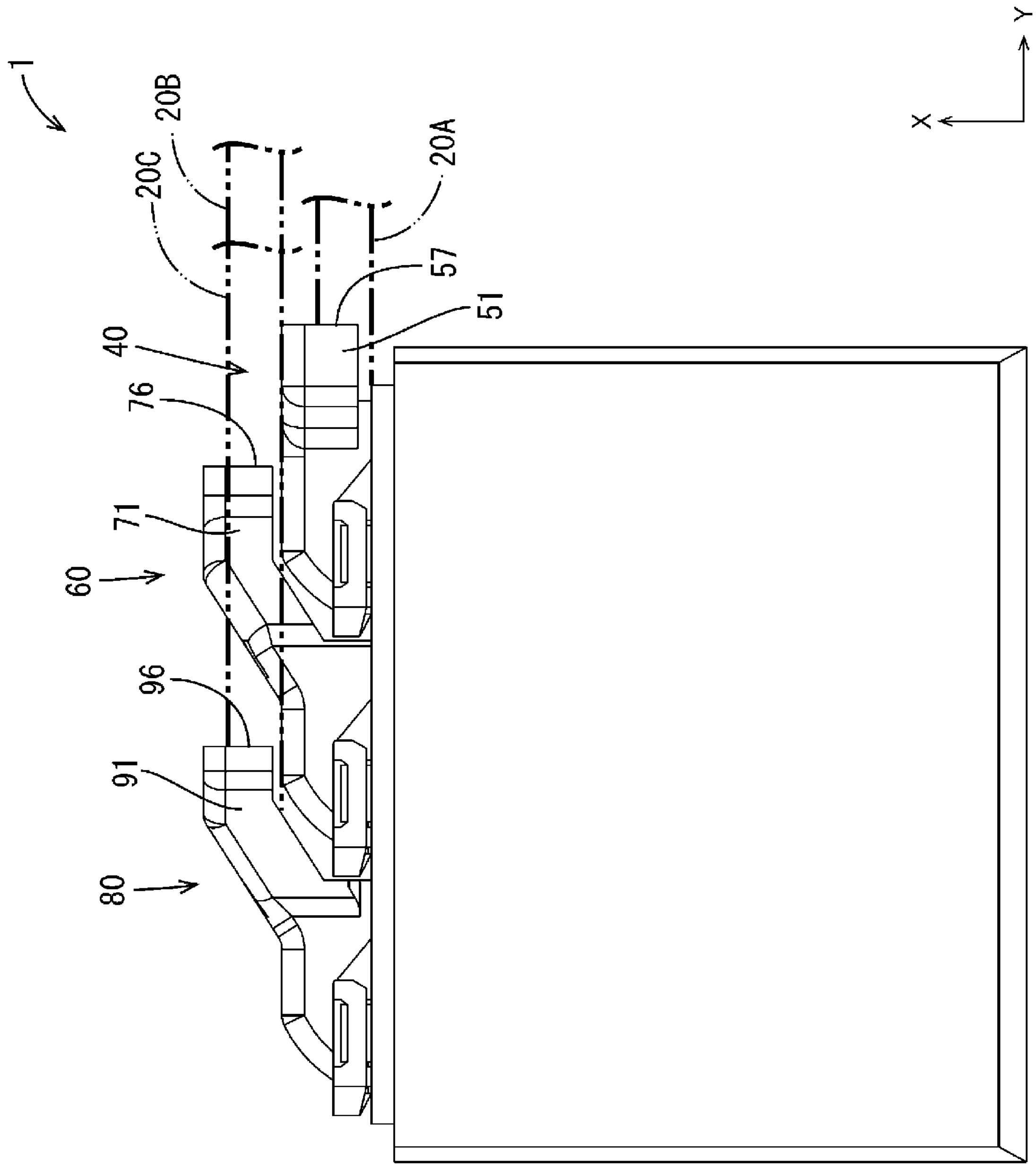
FIG. 21 is a side view of an electronic unit according to the first embodiment.
Figure 22:
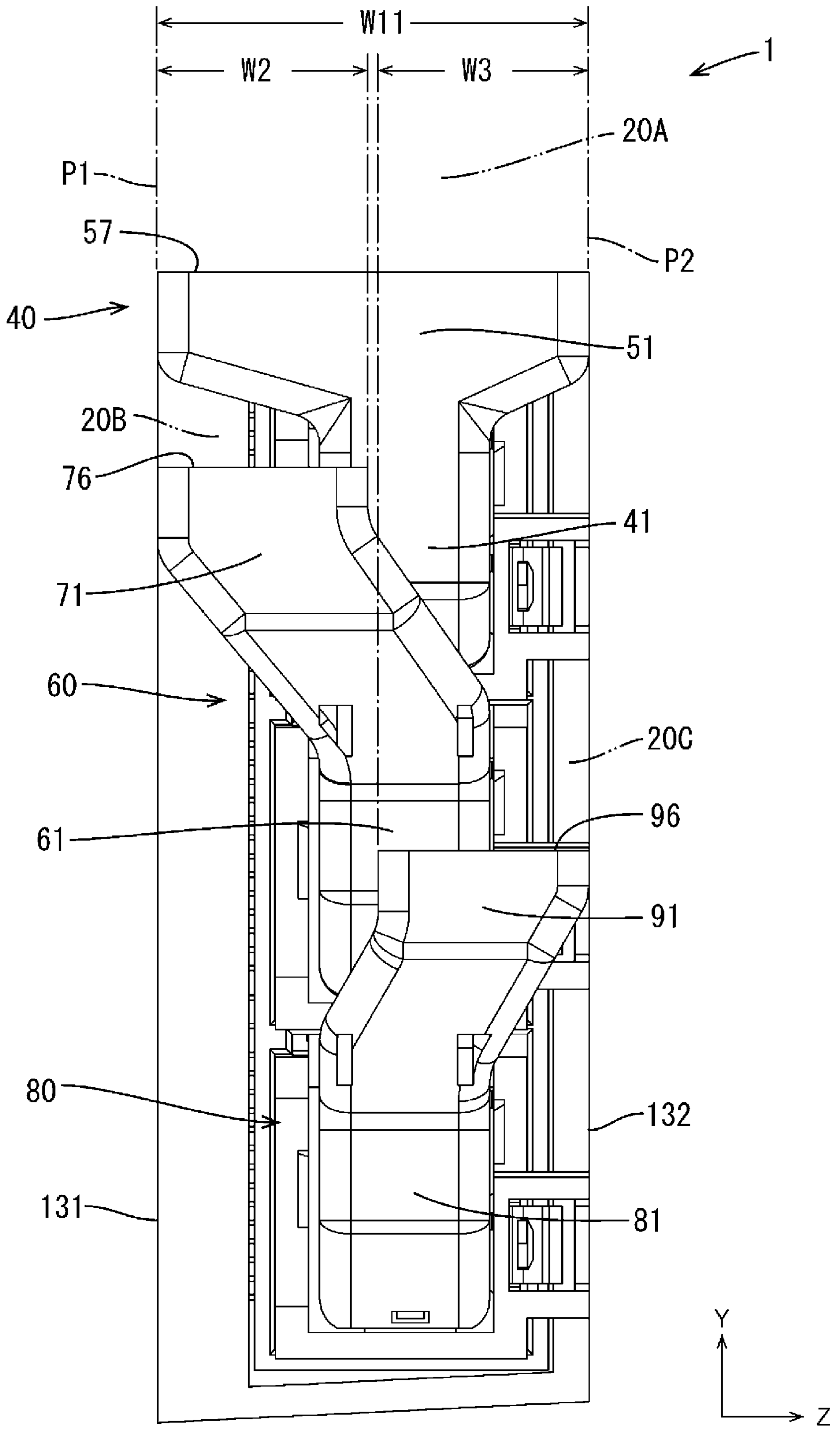
FIG. 22 is a plan view of the electronic unit according to the first embodiment.
Figure 23:
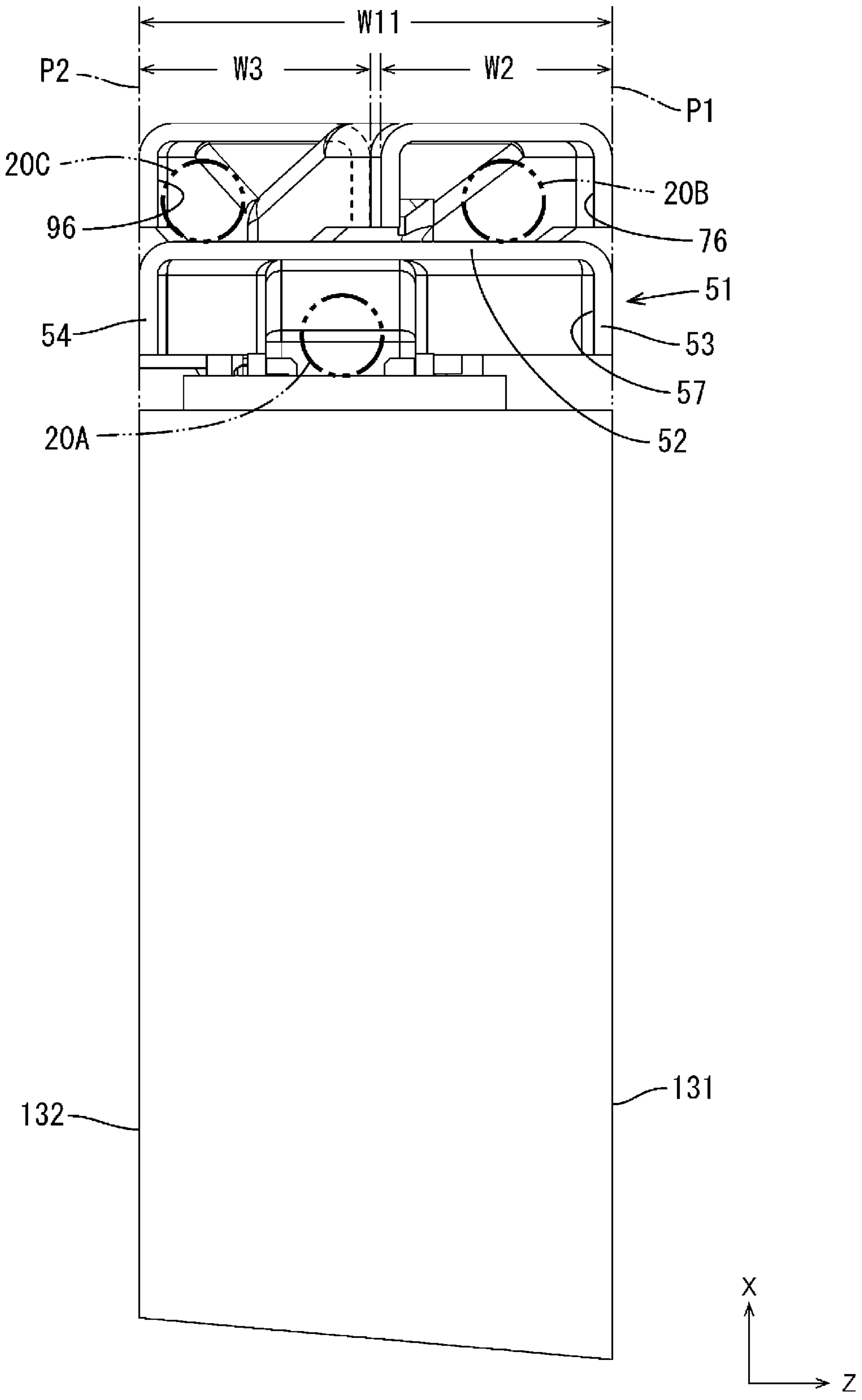
FIG. 23 is a front view of the electronic unit according to the first embodiment.

As depicted in FIG. 2, the covered connector 10 includes a first housing 11A, a second housing 11B and a third housing 11C, levers 30 that are attached to these three housings 11A, 11B and 11C, and a first wire cover 40, a second wire cover 60, and a third wire cover 80 that are respectively attached to the three housings 11A, 11B, and 11C. The first housing 11A, the second housing 11B, and the third housing 11C hold terminal portions of first electric wires 20A, second electric wires 20B, and third electric wires 20C, respectively. The first wire cover 40, the second wire cover 60, and the third wire cover 80 respectively cover the wires 20A, 20B and 20C that extend out from the three housings 11A, 11B and 11C. Note that for ease of illustration, FIGS. 21, 22, and 23 schematically depict the electric wires 20A, 20B, and 20C that extend out from the three wire covers 40, 60, and 80, with the wires 20A, 20B, and 20C being omitted from the other drawings.

The first housing 11A, the second housing 11B, and the third housing 11C are disposed so as to be aligned in that order in a state where the housings 11A to 11C are mated to the mating connector 100. The first housing 11A, the second housing 11B, and the third housing 11C are mated to and removed from the mating connector 100 in a direction which is perpendicular to the direction in which the first housing 11A, the second housing 11B, and the third housing 11C are aligned. In the following description, this direction in which the first housing 11A, the second housing 11B, and the third housing 11C are mated to and removed from the mating connector 100 is referred to as the "vertical direction" (or "X-axis direction"), the direction in which the first housing 11A, the second housing 11B, and the third housing 11C are aligned is referred to as the "front-rear direction" (or "Y-axis direction"), and a direction that is perpendicular to both the X-axis direction and the Y-axis direction is referred to as the "Z-axis direction." The following description assumes that the first housing 11A side is the front.

[Housings 11A, 11B, and 11C]

Since the first housing 11A, the second housing 11B, and the third housing 11C have the same configuration, in the following description, only the first housing 11A will be described in detail. Components of the second housing 11B and the third housing 11C that are the same as those in the first housing 11A have been assigned the same reference numerals and description thereof is omitted.

Figure 3:
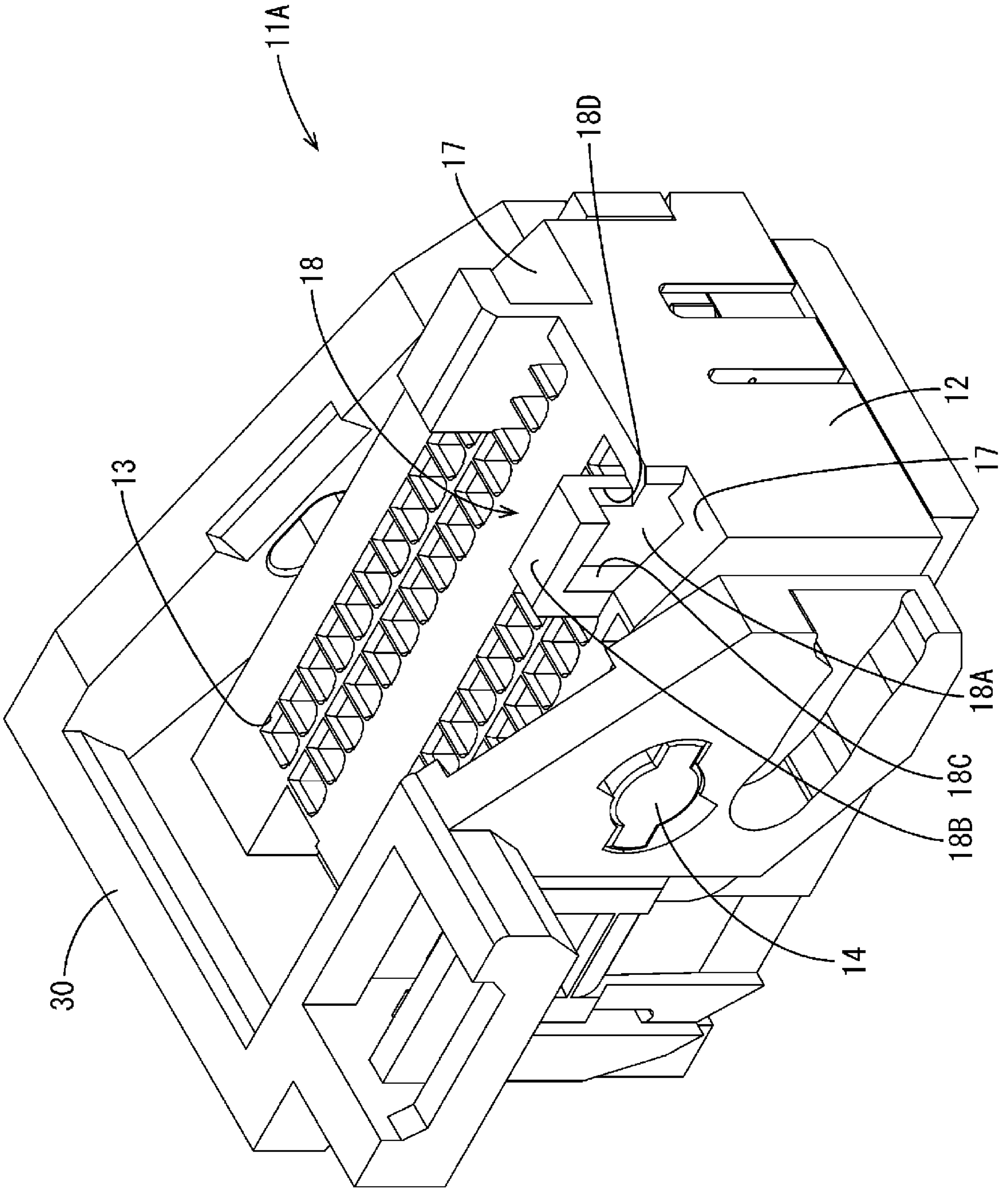
FIG. 3 is a perspective view of a first housing to which a lever has been attached according to the first embodiment.
Figure 4:
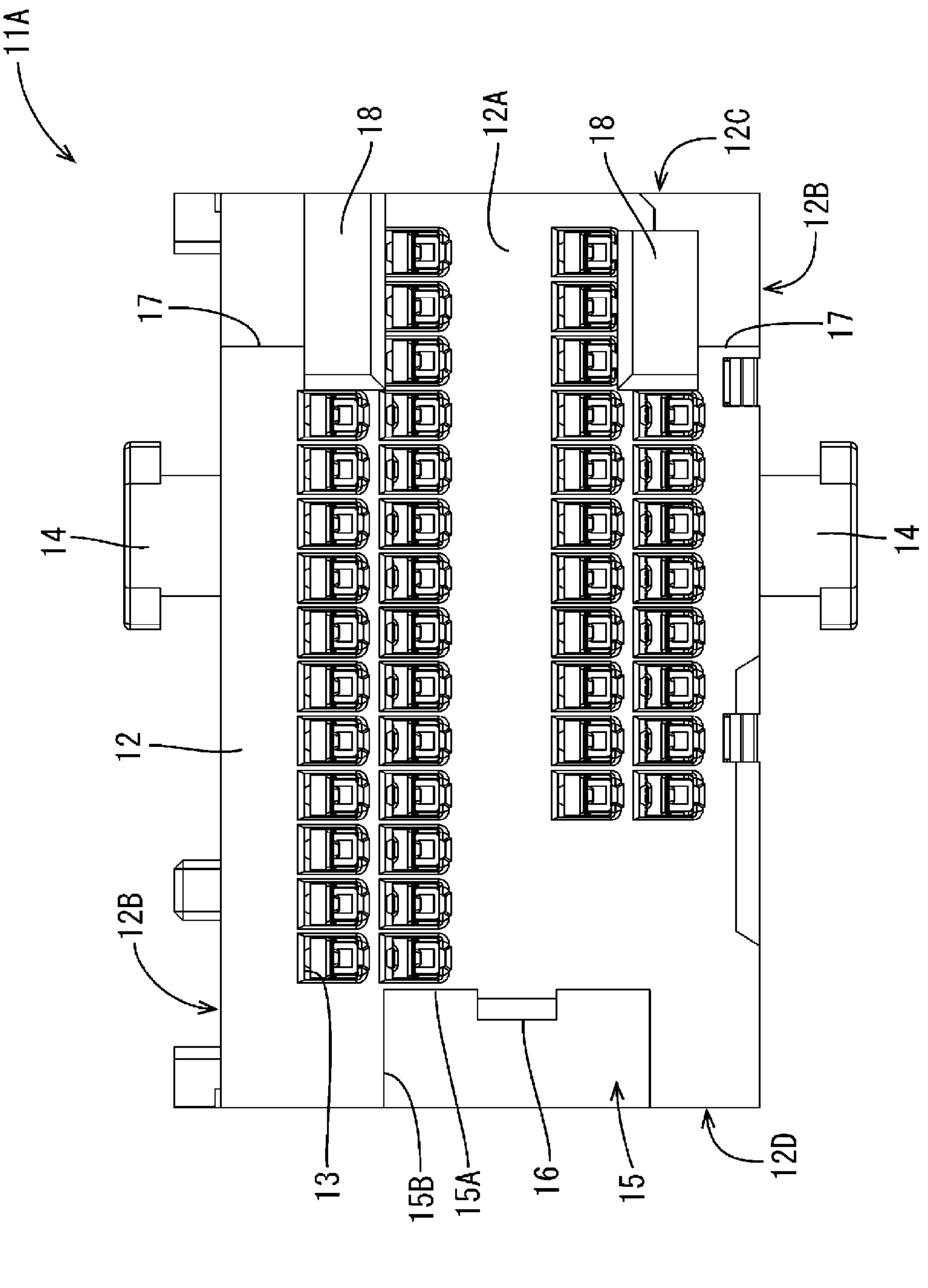
FIG. 4 is a plan view of the first housing according to the first embodiment.
Figure 5:
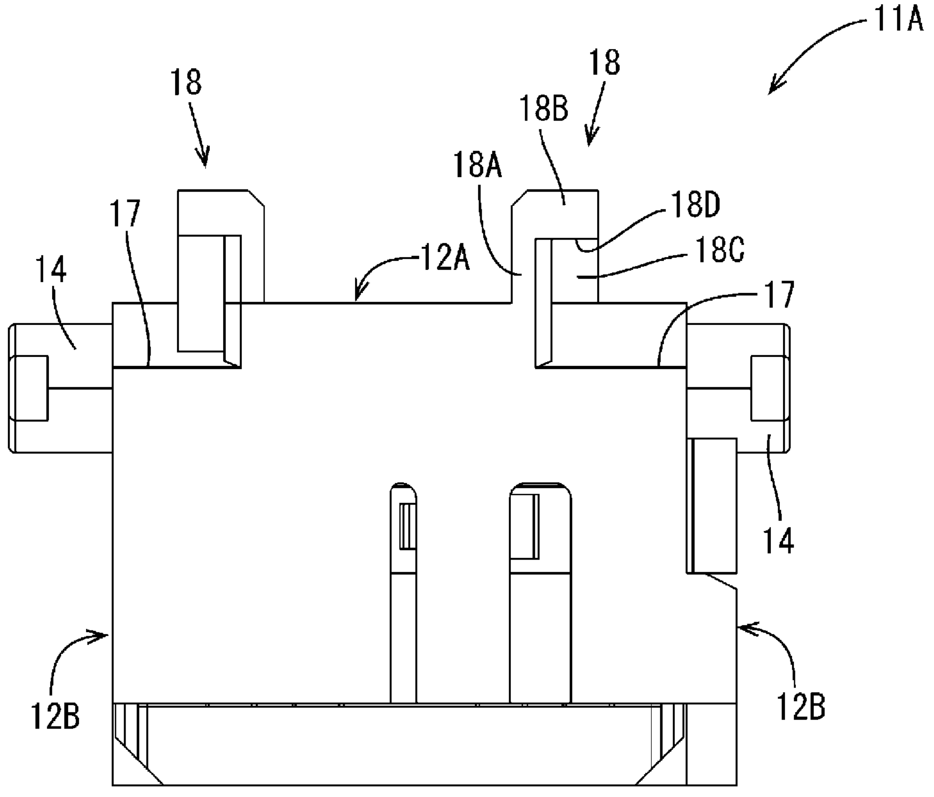
FIG. 5 is a front view of the first housing according to the first embodiment.

The first housing 11A is made of synthetic resin. As depicted in FIGS. 3, 4 and 5, the first housing 11A includes a wire holding portion 12 and two rotational shafts 14 that extend from the wire holding portion 12.

The wire holding portion 12 is in the overall shape of a cuboid. As depicted in FIGS. 4 and 5, the outer surface of the wire holding portion 12 includes a wire exit surface 12A, two side attachment surfaces 12B that are parallel to each other and perpendicular to the wire exit surface 12A, and a front attachment surface 12C and a rear attachment surface 12D that are parallel to each other and perpendicular to the wire exit surface 12A and the side attachment surfaces 12B. The first housing 11A is attached to the mating connector 100 with the front attachment surface 12C facing the front.

As depicted in FIGS. 3 and 4, the wire holding portion 12 has a plurality of cavities 13 which are openings in the wire exit surface 12A. A female terminal fitting and a terminal portion of a first electric wire 20A that is connected to the female terminal fitting are held inside each cavity 13. As depicted in FIGS. 4 and 5, the two rotational shafts 14 are substantially cylindrical and protrude from the two side attachment surfaces 12B.

As depicted in FIG. 4, the first housing 11A includes an attachment recess 15 that is recessed from the rear attachment surface 12D. The attachment recess 15 is a recess defined by an inner surface 15A that is parallel to the rear attachment surface 12D and a side surface 15B that joins the inner surface 15A and the rear attachment surface 12D. An attachment claw 16 that protrudes from the inner surface 15A is disposed inside the attachment recess 15.

As depicted in FIGS. 3, 4 and 5, the first housing 11A includes stepped portions 17, which extend downward from the wire exit surface 12A toward the front attachment surface 12C, at both ends of a corner portion formed by the wire exit surface 12A and the front attachment surface 12C, and is also provided with two cover locking portions 18 that are adjacent to these stepped portions 17. As depicted in FIGS. 3 and 5, each cover locking portion 18 includes a first erected wall 18A that is erected on the wire exit surface 12A at a position that is slightly inward of one side attachment surface 12B (that is, a position that is closer to the other side attachment surface 12B), an locking wall 18B that extends outward (in a direction toward the one side attachment surface 12B) from the protruding end of the first erected wall 18A, and a second erected wall 18C that extends outward from a rear end of the first erected wall 18A and is connected to the locking wall 18B. A space defined by the first erected wall 18A, the second erected wall 18C, and the locking wall 18B forms a locking recess 18D. The other cover locking portion 18 has the same configuration as the one cover locking portion 18 described above and is disposed in a back-to-back arrangement with the one cover locking portion 18 described above.

[Levers 30]

Since the three levers 30 attached to the three housings 11A, 11B, and 11C have the same configuration, the lever 30 attached to the first housing 11A will be described in detail below and description of the other levers 30 is omitted.

Figure 6:
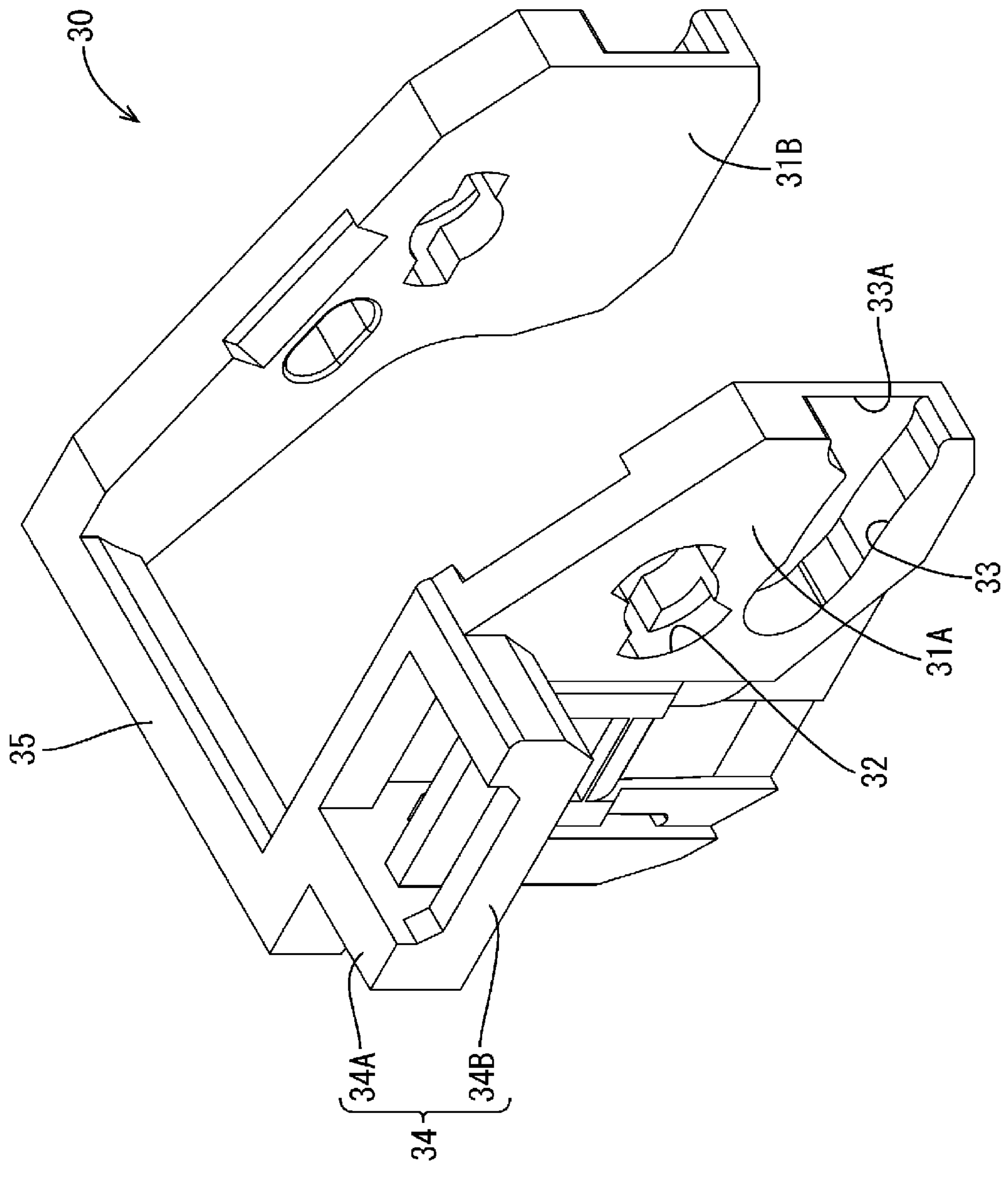
FIG. 6 is a perspective view of the lever according to the first embodiment.

This lever 30 is a member that assists the mating to and disengagement from the mating connector 100 of the first housing 11A using the principle of leverage. The lever 30 is made of synthetic resin, and as depicted in FIG. 6, is a substantially U-shaped member including two cam plates 31A and 31B and a connecting portion 35 that connects the two cam plates 31A and 31B.

The two cam plates 31A and 31B each have a shaft hole 32 and a cam groove 33. Each shaft hole 32 is a substantially circular hole that passes through a cam plate 31A. The cam groove 33 is a groove provided in the outer surface of a cam plate 31A (that is, the surface on the opposite side to the other cam plate 31A), and has a cam entrance 33A on the outer edge of the cam plate 31A. The cam groove 33 is substantially arc-shaped so as to gradually approach the shaft hole 32, which is the center of rotation of the cam plate 31A, as the cam groove 33 extends from the cam entrance 33A into the cam plate 31A.

The lever 30 has a rotational operating portion 34 that extends from one cam plate 31A. The rotational operating portion 34 includes two column portions 34A that extend outward from the cam plate 31A, and a bridge portion 34B that joins the two column portions 34A.

As depicted in FIG. 3, the lever 30 is attached so as to straddle the first housing 11A, with the respective rotational shafts 14 inserted through the respective shaft holes 32. The lever 30 is supported so as to be rotatable about the rotational shafts 14 between a mating start position (the position depicted in FIGS. 2 and 19) and a mating completion position (the position depicted in FIGS. 3 and 20) where a state where the mating connector 100 has been mated to the first housing 11A at a regular mating position is achieved.

[Wire Covers 40, 60, and 80]

Figure 7:
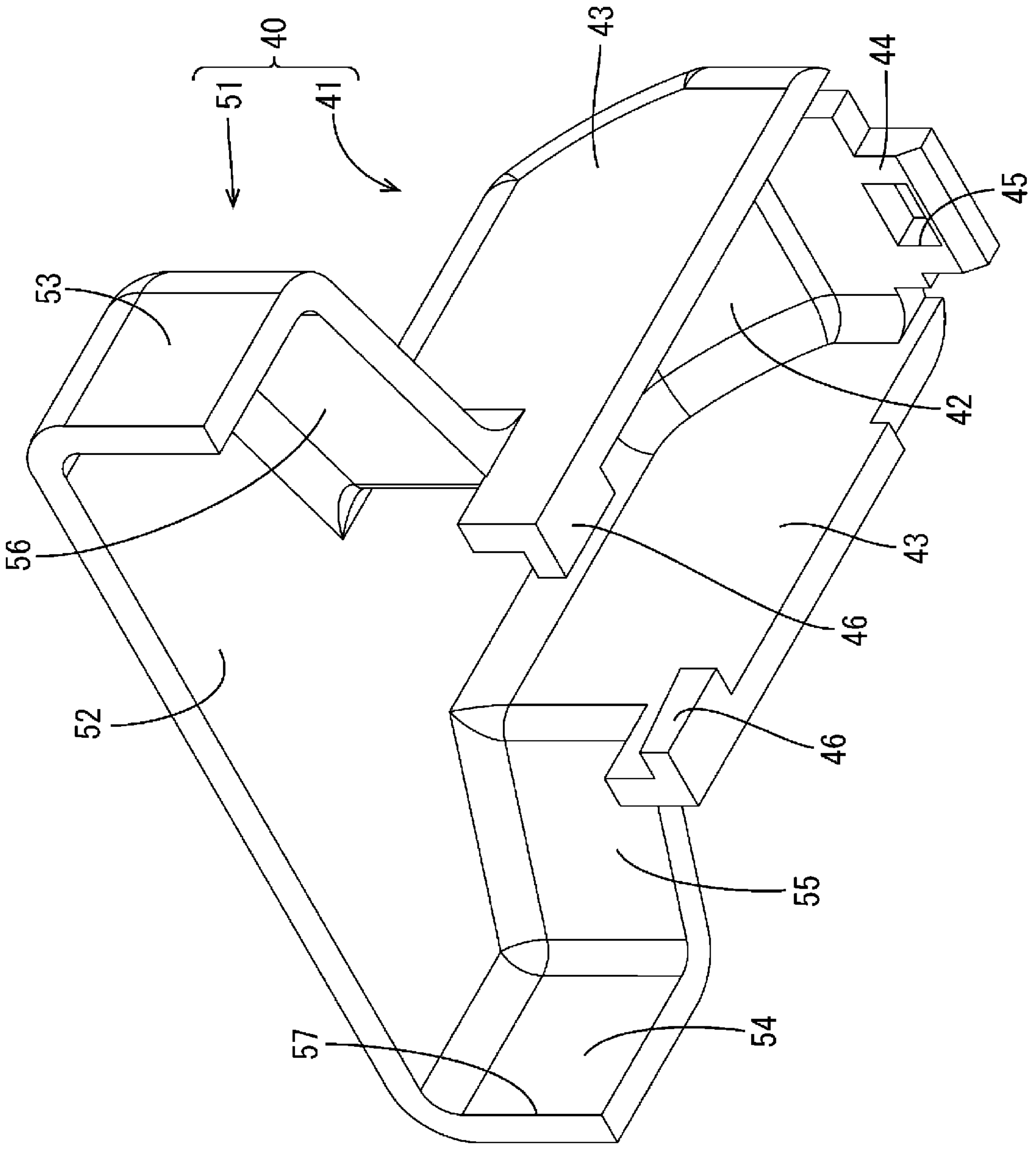
FIG. 7 is a perspective view of a first wire cover according to the first embodiment.
Figure 8:
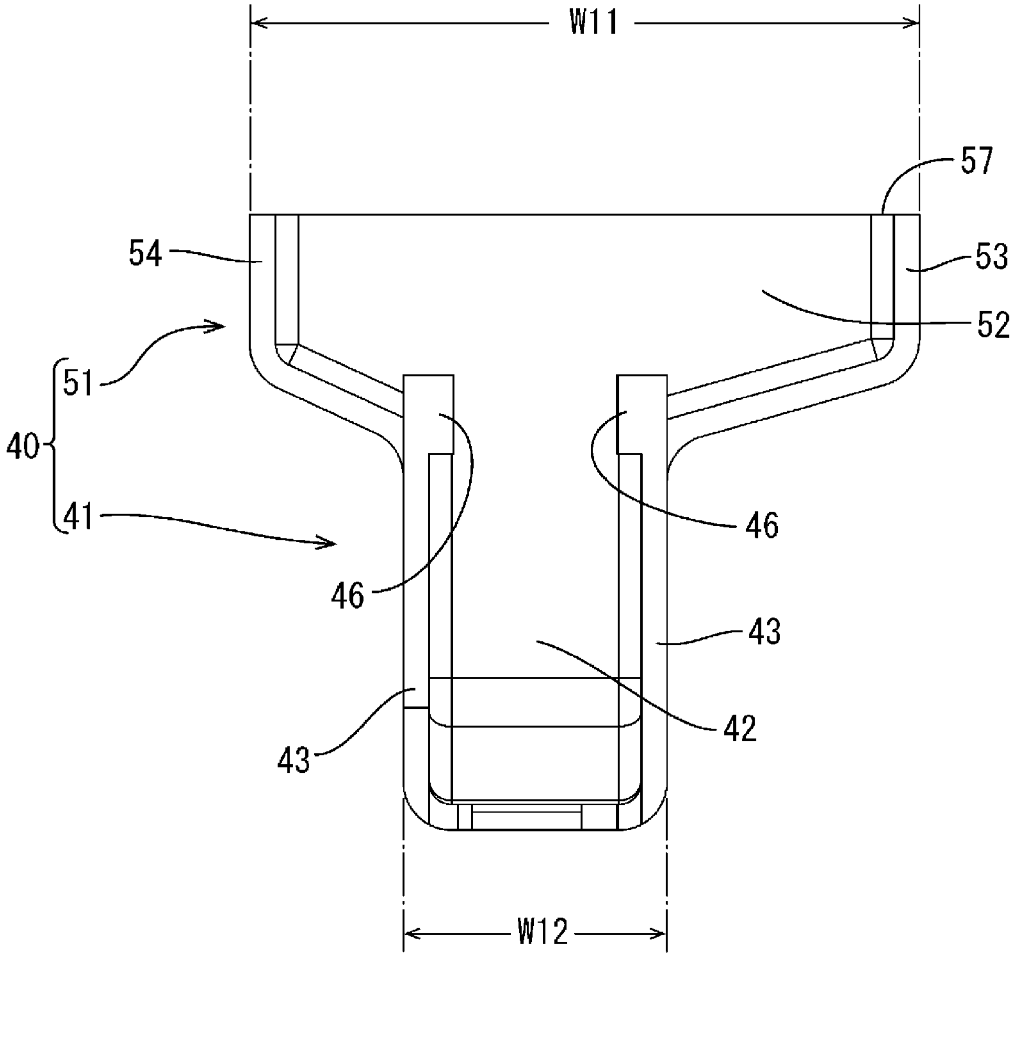
FIG. 8 is a bottom view of the first wire cover according to the first embodiment.

The first wire cover 40 is a member that is attached to the first housing 11A and covers the first wires 20A that extend from the first housing 11A. As depicted in FIGS. 7 and 8, the first wire cover 40 includes a first cover main body 41 that is attached to the first housing 11A and a first wire restricting portion 51 that is continuous with the first cover main body 41.

The first cover main body 41 includes a first cover main wall 42 that covers the wire exit surface 12A of the first housing 11A, two first cover side walls 43 that extend from two side edges of the first cover main wall 42 and are disposed facing each other, an attachment hook 44 that extends from a rear edge of the first cover main wall 42, and locking protrusions 46 that extend from the two first cover side walls 43. The first cover main wall 42 is disposed facing the wire exit surface 12A, and a rear end portion of the first cover main wall 42 is shaped like an arch so as to approach the wire exit surface 12A toward a rear end of the first cover main wall 42. The attachment hook 44 has an attachment hole 45 for receiving the attachment claw 16. The two locking protrusions 46 extend inward toward each other (that is, toward the other first cover side wall 43) from front end portions of the two first cover side walls 43.

The first wire restricting portion 51 includes a first restricting main wall 52 that extends toward the front from the first cover main wall 42 and is disposed on the same plane as the first cover main wall 42, a first restricting side wall 53 and a second restricting side wall 54 that extend from two side edges of the first restricting main wall 52 and face each other, a first connecting wall 55 that joins the first restricting side wall 53 and one of the first cover side walls 43, and a second connecting wall 56 that joins the second restricting side wall 54 and the other first cover side wall 43. The first restricting main wall 52 extends outward on both sides from the first cover main wall 42, and the first restricting side wall 53 and the second restricting side wall 54 are disposed further outside than the two first cover side walls 43. The first wire restricting portion 51 has an opening at the front, with this opening serving as a first wire exit port 57 through which the first wires 20A are led to the outside. As depicted in FIG. 8, a width W11 of the first wire restricting portion 51 defined as a distance between the outer surface of the first restricting side wall 53 and the outer surface of the second restricting side wall 54 is wider than a width W12 of the first cover main body 41 defined as a distance between the outer surfaces of the two first cover side walls 43.

Figure 9:
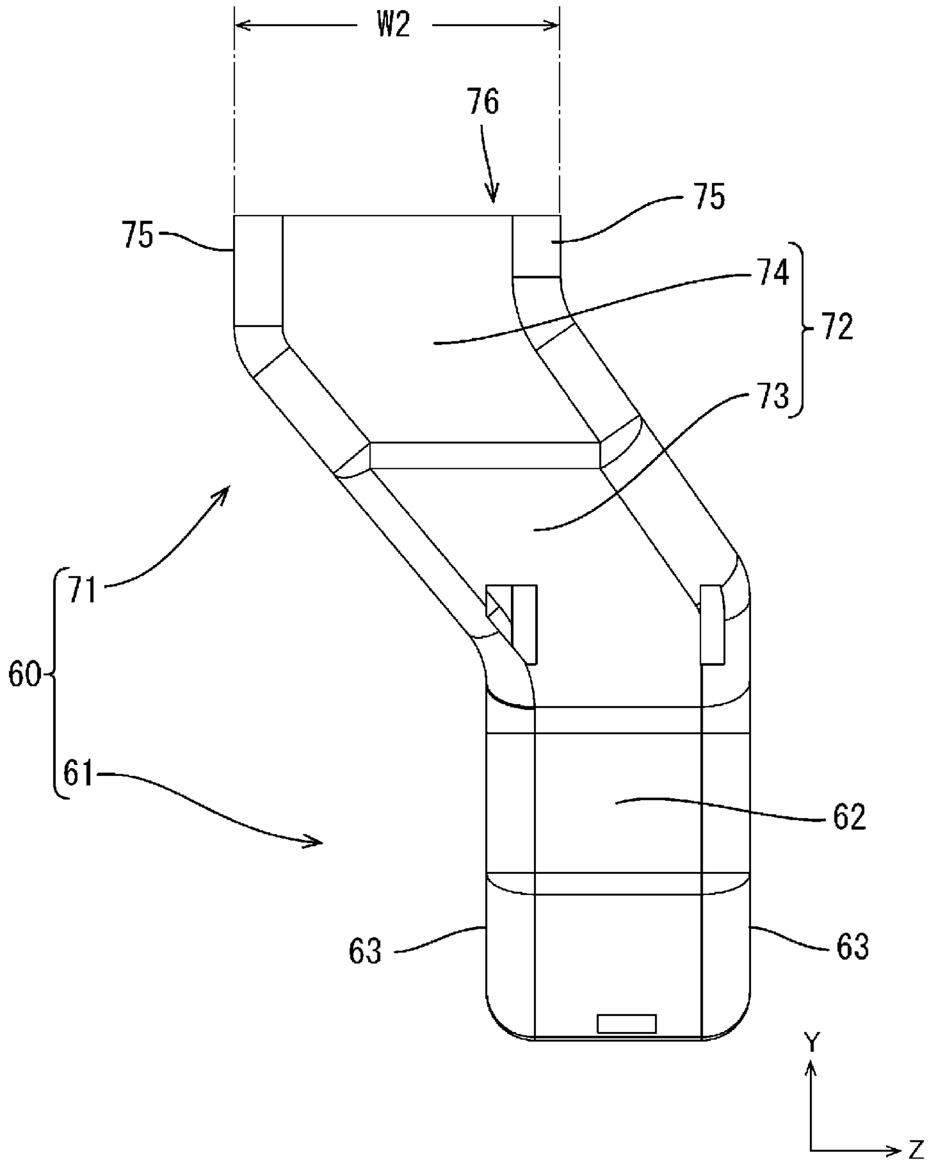
FIG. 9 is a plan view of a second wire cover according to the first embodiment.
Figure 10:
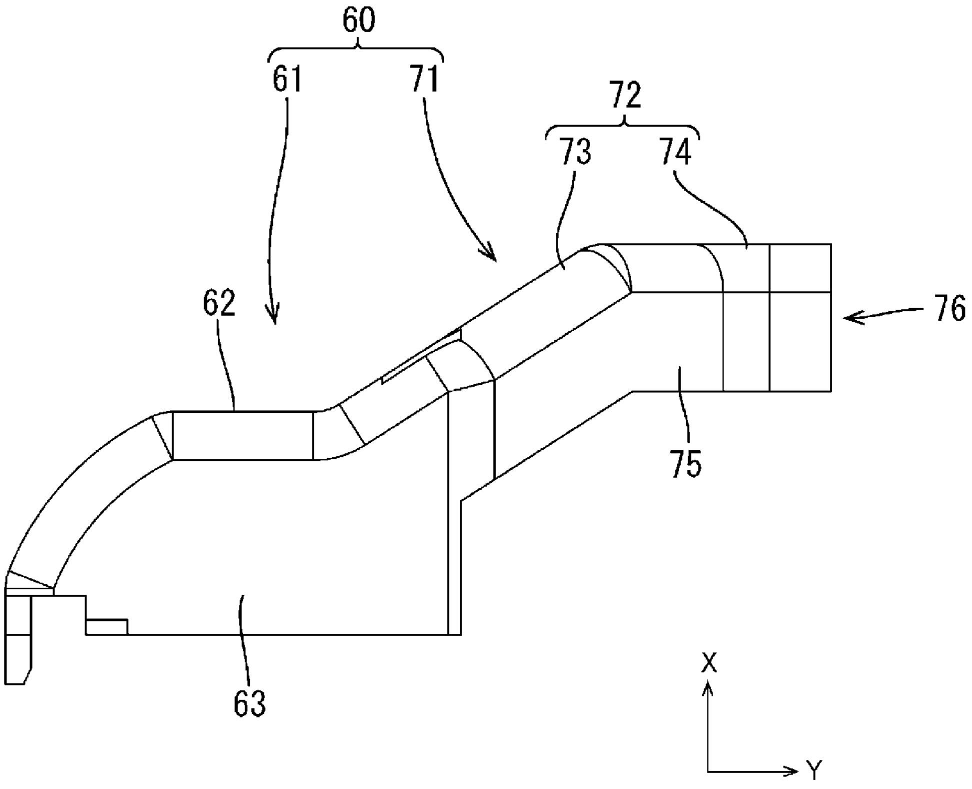
FIG. 10 is a side view of the second wire cover according to the first embodiment.

The second wire cover 60 is a member that is attached to the second housing 11B and covers the second wires 20B that extend from the second housing 11B. As depicted in FIGS. 9 and 10, the second wire cover 60 includes a second cover main body 61 that is attached to the second housing 11B and a second wire restricting portion 71 that extends diagonally forward from the second cover main body 61 (diagonally upward and to the left in FIGS. 9 and 22).

The second cover main body 61 includes a second cover main wall 62 that covers the wire exit surface 12A of the second housing 11B and two second cover side walls 63 that extend from two side edges of the second cover main wall 62 and are disposed facing each other. The second cover main wall 62 is disposed facing the wire exit surface 12A. A rear end portion of the second cover main wall 62 is shaped like an arch so as to approach the wire exit surface 12A toward a rear end of the second cover main wall 62, and a front end portion of the second cover main wall 62 is inclined so as to become distant from the wire exit surface 12A toward the front end of the second cover main wall 62. Although not depicted in detail, the second cover main body 61 includes an attachment hook 44 and two locking protrusions that have the same shapes as the attachment hook 44 and the locking protrusions 46 provided on the first cover main body 41.

The second wire restricting portion 71 includes a second restricting main wall 72 that extends from the second cover main wall 62 and two third restricting side walls 75 that extend from two side edges of the second restricting main wall 72 and face each other. The second restricting main wall 72 includes a first inclined wall 73 that extends from a front end of the second cover main wall 62 and a first extending wall 74 that extends from a front end of the first inclined wall 73. The first inclined wall 73 is inclined so as to become more distant from the wire exit surface 12A toward a front end of the first inclined wall 73, and extends diagonally forward (that is, diagonally upward to the left in FIGS. 9 and 22). The first extending wall 74 extends directly forward in parallel with the wire exit surface 12A from a front end of the first inclined wall 73. The second wire restricting portion 71 has an opening at the front, with this opening serving as a second wire exit port 76 through which the second wires 20B are led to the outside (see FIG. 2 also). A width W2 of the second wire restricting portion 71 defined as a distance between the outer surfaces of the two third restricting side walls 75 is smaller than the width W11 of the first wire restricting portion 51, as depicted in FIG. 22.

Figure 11:
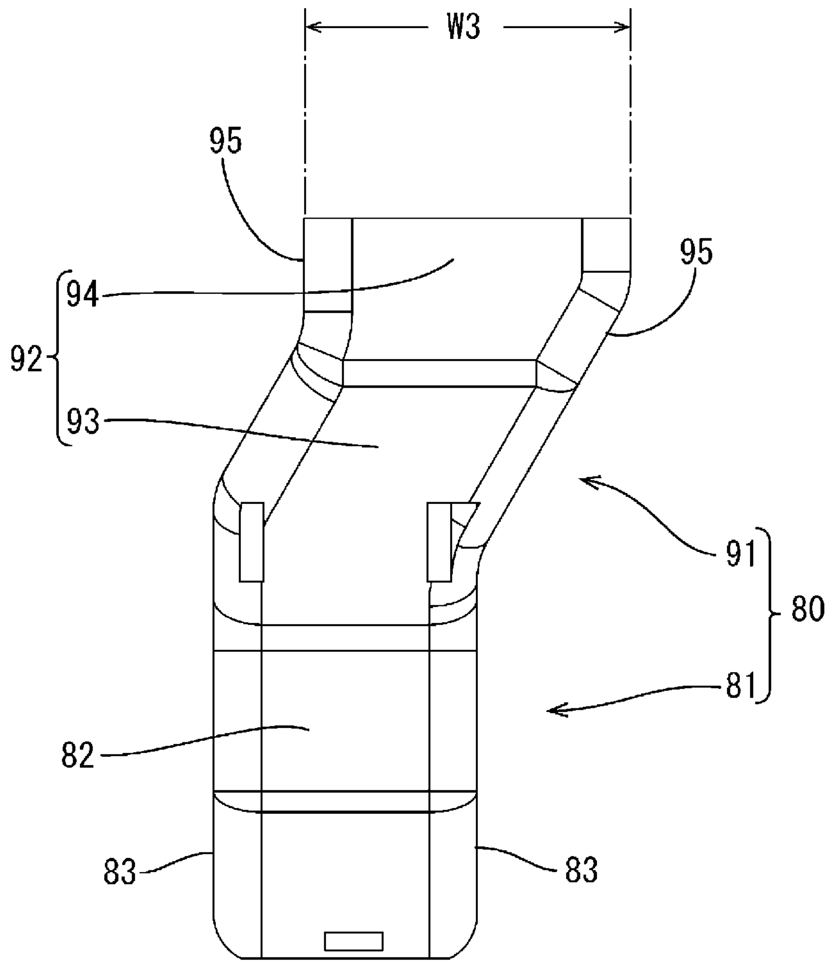
FIG. 11 is a plan view of a third wire cover according to the first embodiment.
Figure 12:
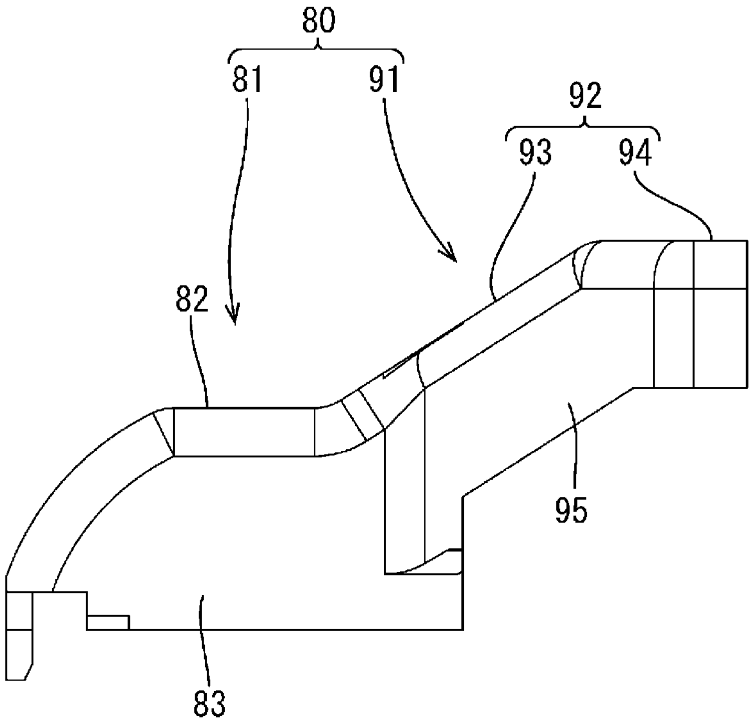
FIG. 12 is a side view of the third wire cover according to the first embodiment.

The third wire cover 80 is a member that is attached to the third housing 11C and covers the third wires 20C that extend from the third housing 11C. As depicted in FIGS. 11 and 12, the third wire cover 80 includes a third cover main body 81 that is attached to the second housing 11B and a third wire restricting portion 91 that extends diagonally forward (that is, diagonally upward to the right in FIGS. 11 and 22) from the third cover main body 81 in a different direction to the second wire restricting portion 71.

The third cover main body 81 includes a third cover main wall 82 that covers the wire exit surface 12A of the third housing 11C, and two third cover side walls 83 that extend from two side edges of the third cover main wall 82 and are disposed facing each other. The third cover main wall 82 is disposed facing the wire exit surface 12A. A rear end portion of the third cover main wall 82 is shaped like an arch so as to approach the wire exit surface 12A toward a rear end of the third cover main wall 82, and a front end portion of the third cover main wall 82 is inclined so as to become distant from the wire exit surface 12A toward a front end of the third cover main wall 82. Although not depicted in detail, the third cover main body 81 includes an attachment hook and two locking protrusions that have the same shapes as the attachment hook 44 and the locking protrusions 46 provided on the first cover main body 41.

The third wire restricting portion 91 includes a third restricting main wall 92 that extends from the third cover main wall 82 and two fourth restricting side walls 95 that extend from two side edges of the third restricting main wall 92 and face each other. The third restricting main wall 92 includes a second inclined wall 93 that extends from a front end of the third cover main wall 82 and a second extending wall 94 that extends from a front end of the second inclined wall 93. The second inclined wall 93 is inclined so as to become more distant from the wire exit surface 12A toward a front end of the second inclined wall 93, and extends diagonally forward in a different direction to the second wire restricting portion 71 (that is, diagonally upward to the right in FIGS. 11 and 22). The second extending wall 94 extends directly forward in parallel with the wire exit surface 12A from a front end of the second inclined wall 93. The third wire restricting portion 91 has an opening at the front, with this opening serving as a third wire exit port 96 through which the third wires 20C are led to the outside (see FIG. 2 also). A width W3 of the third wire restricting portion 91 defined as a distance between the outer surfaces of the two fourth restricting side walls 95 is smaller than the width W11 of the first wire restricting portion 51, as depicted in FIG. 22.

Figure 13:
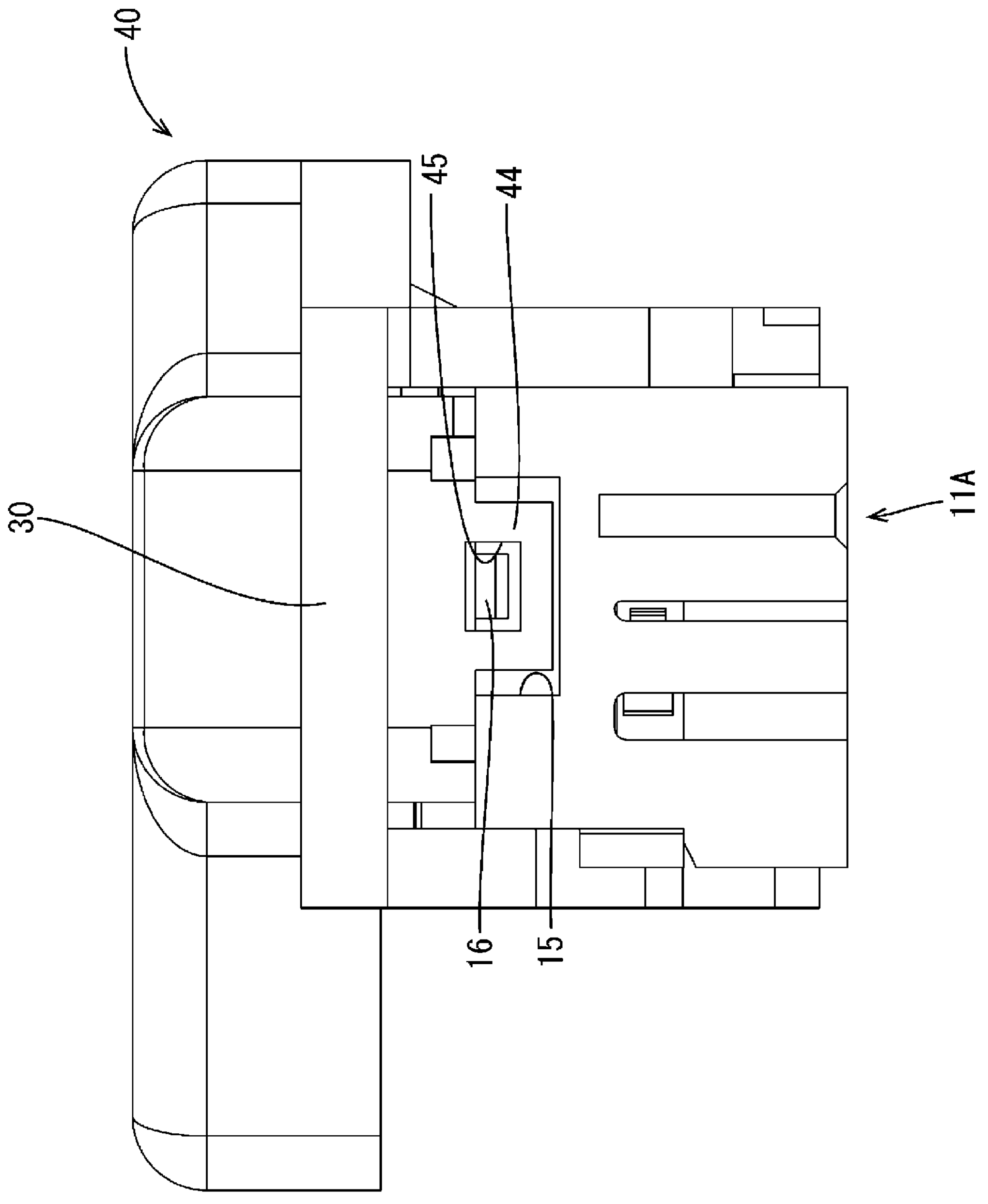
FIG. 13 is a rear view depicting a state in which the lever and the first wire cover have been attached to the first housing according to the first embodiment.
Figure 14:
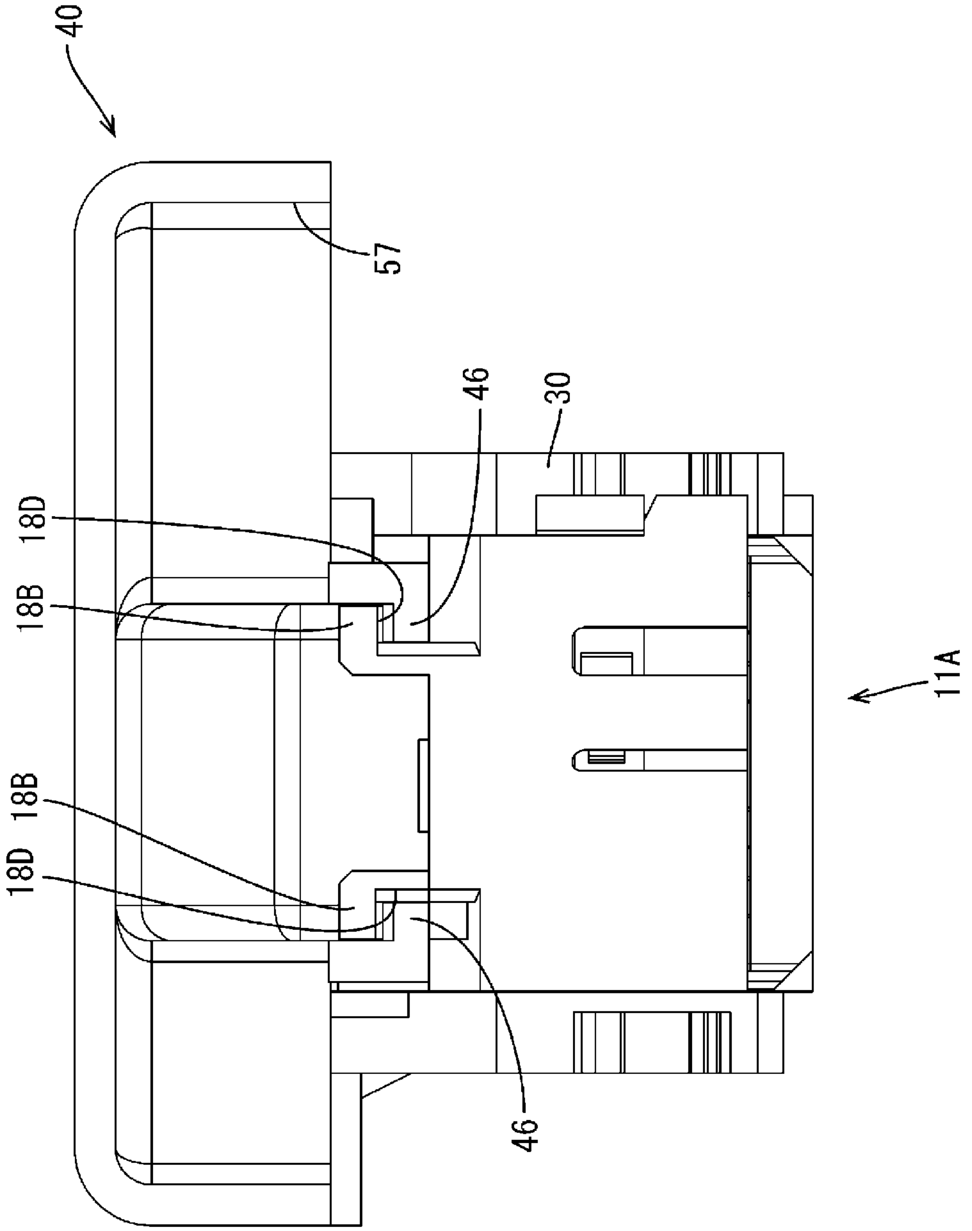
FIG. 14 is a front view depicting the state in which the lever and the first wire cover have been attached to the first housing according to the first embodiment.

In a state where the first wire cover 40 has been attached to the first housing 11A, as depicted in FIG. 13, the attachment hook 44 is accommodated inside the attachment recess 15, and the attachment claw 16 advances inside and locks onto an edge of the attachment hole 45. As depicted in FIG. 14, the two locking protrusions 46 advance inside the two locking recesses 18D and become locked onto the locking walls 18B. By doing so, the first wire cover 40 is held by the first housing 11A. The first electric wires 20A that extend out from the wire exit surface 12A of the first housing 11A extend to the front while being bent around the inner surface of the first electric wire cover 40, and as depicted in FIGS. 21 and 22, are led out from the first wire exit port 57. The same applies to the second wire cover 60 and the second housing 11B, and to the third wire cover 80 and the third housing 11C.

[Mating Connector 100]

Figure 15:
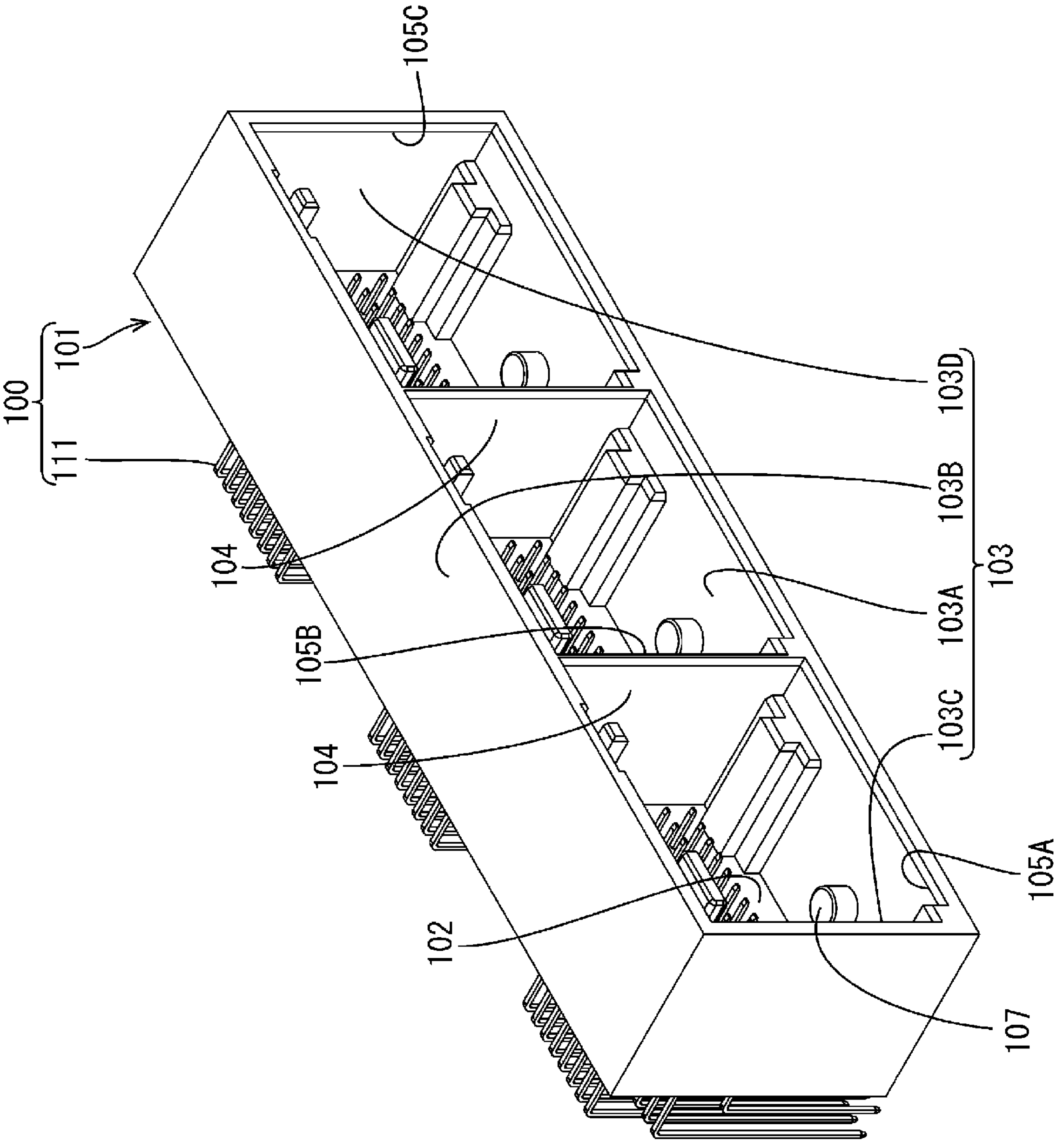
FIG. 15 is a perspective view of a mating connector according to the first embodiment.
Figure 16:
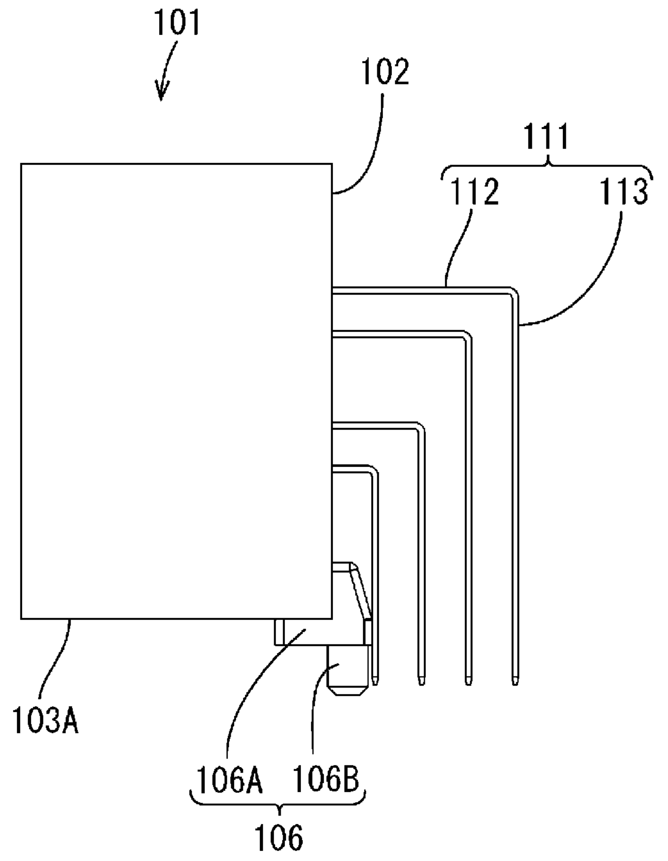
FIG. 16 is a rear view of the mating connector according to the first embodiment.
Figure 17:
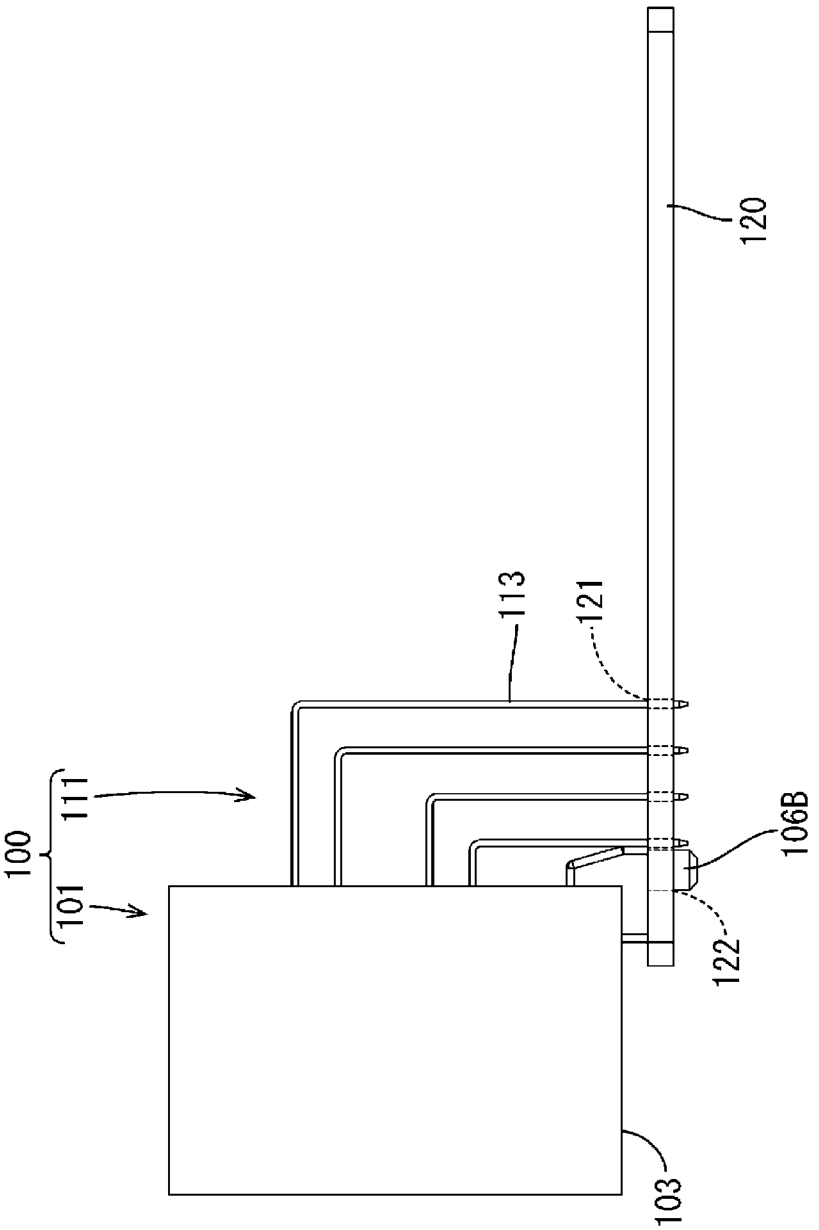
FIG. 17 is a rear view depicting a state where the mating connector according to the first embodiment has been fixed to a circuit board.

As depicted in FIGS. 15, 16 and 17, the mating connector 100 includes a mating housing 101, which is fixed to one surface of the circuit board 120 and is capable of mating with the first housing 11A, the second housing 11B, and the third housing 11C, and a plurality of male terminal fittings 111, which are attached to the mating housing 101.

The mating housing 101 is made of synthetic resin and includes a terminal holding wall 102, a hood portion 103, two partition walls 104, and a plurality of fixing portions 106.

The terminal holding wall 102 is in the form of a rectangular plate. The hood portion 103 extends from the terminal holding wall 102 in the shape of a rectangular cylinder, and includes a base wall 103A disposed along the circuit board 120, a facing wall 103B that is parallel to the base wall 103A, and a front wall 103C and a rear wall 103D that join the base wall 103A and the facing wall 103B. The two partition walls 104 are disposed inside the hood portion 103 and partition an internal space of the mating housing 101 defined by the terminal holding wall 102 and the hood portion 103 into three spaces. The three spaces produced by partitioning by the partition walls 104 are mating spaces 105A, 105B, and 105C that respectively receive the first housing 11A, the second housing 11B, and the third housing 11C.

As depicted in FIGS. 16 and 17, each of the plurality of fixing portions 106 includes an L-shaped pedestal portion 106A disposed at a corner formed by the terminal holding wall 102 and the base wall 103A, and a fixing protrusion 106B that extends from the pedestal portion 106A. Note that in FIGS. 16 and 17, only one out of the plurality of fixing portions 106 is illustrated.

The mating housing 101 is provided with six cylindrical cam followers 107. As depicted in FIG. 15, three cam followers 107 protrude from an inner surface of the base wall 103A. Although not depicted in detail, three cam followers 107 also protrude from the inner surface of the facing wall 103B in the same way, with one cam follower 107 extending from the base wall 103A and one cam follower 107 extending from the facing wall 103B being disposed on the inside of each of the three mating spaces 105A, 105B, and 105C.

Each of the plurality of male terminal fittings 111 is made of metal, is rod-shaped, and includes a tab portion 112 that passes through the terminal holding wall 102 and a board connecting portion 113 that extends substantially vertically from one end of the tab portion 112.

[Circuit Board 120]

The circuit board 120 is a printed circuit board with a well-known configuration where conductive paths are formed on one surface or both surfaces of an insulating board by printed circuit technology. As depicted in FIG. 17, the circuit board 120 includes a plurality of through holes 121 that are electrically connected to the conductive paths and a plurality of fixing holes 122. The mating housing 101 is fixed to one surface of the circuit board 120 by press-fitting the fixing protrusions 106B into the fixing holes 122. Note that FIG. 17 illustrates only one out of the plurality of fixing holes 122. The board connecting portion 113 of each male terminal fitting 111 is inserted through a corresponding through hole 121 and is electrically connected to a conductive path by soldering.

[Case 130]

Figure 18:
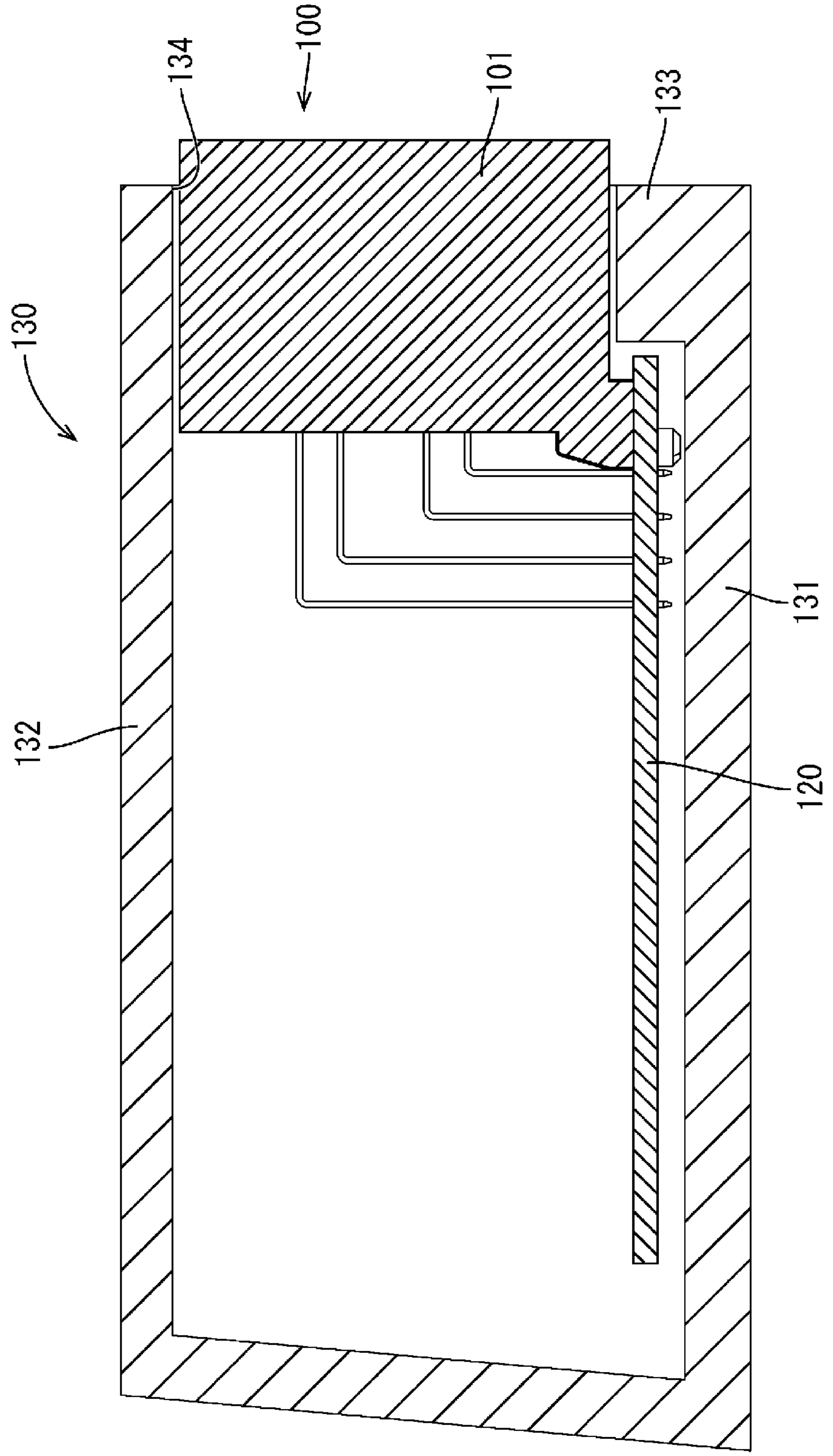
FIG. 18 is a cross-sectional view schematically depicting a state in which the mating connector and the circuit board according to the first embodiment have been housed in a case.

As schematically depicted in FIGS. 1 and 18, the case 130 is in the form of a rectangular box, and includes a first case wall 131 disposed along the circuit board 120, a second case wall 132 that faces the first case wall 131, and a third case wall 133 that joins the first case wall 131 and the second case wall 132. The third case wall 133 has a connector insertion opening 134 through which the mating housing 101 faces the outside.

[Mating of Covered Connector 10 and Mating Connector 100]

Figure 19:
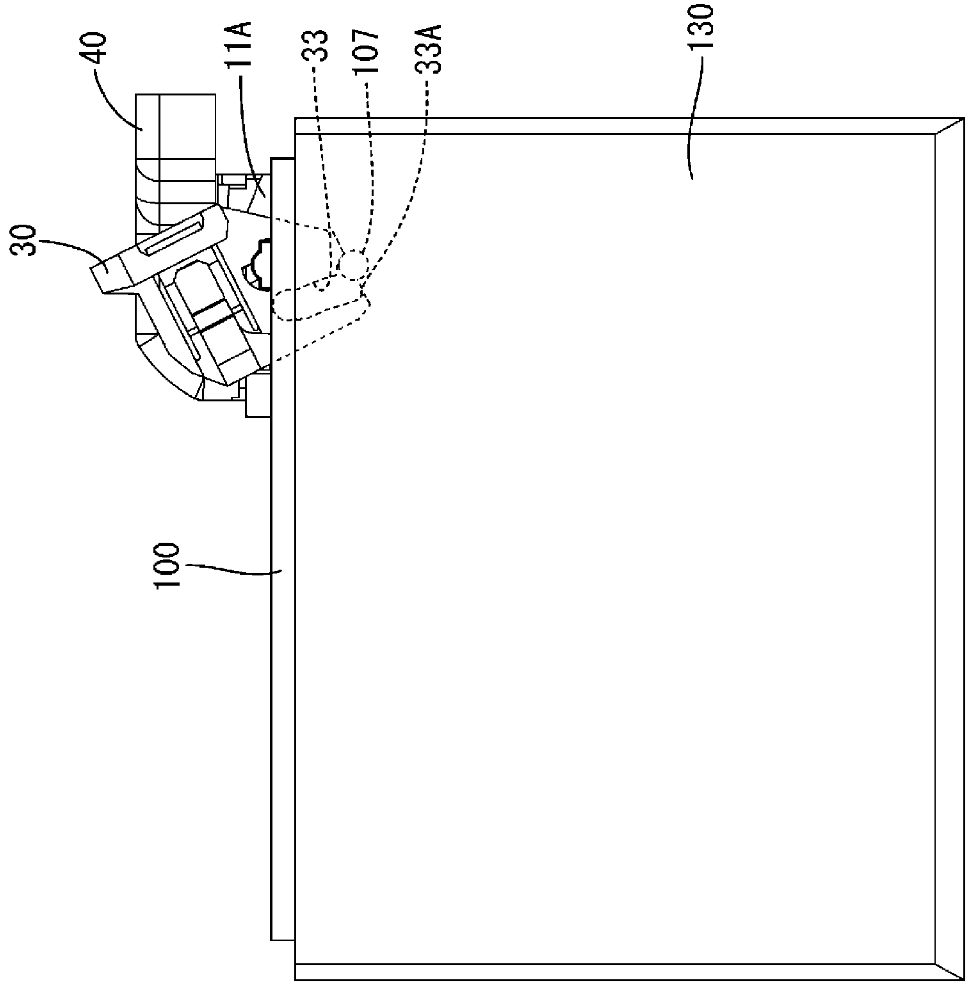
FIG. 19 is a side view depicting a state where the first housing to which the lever and the first wire cover have been attached is initially mated to the mating connector according to the first embodiment.
Figure 20:
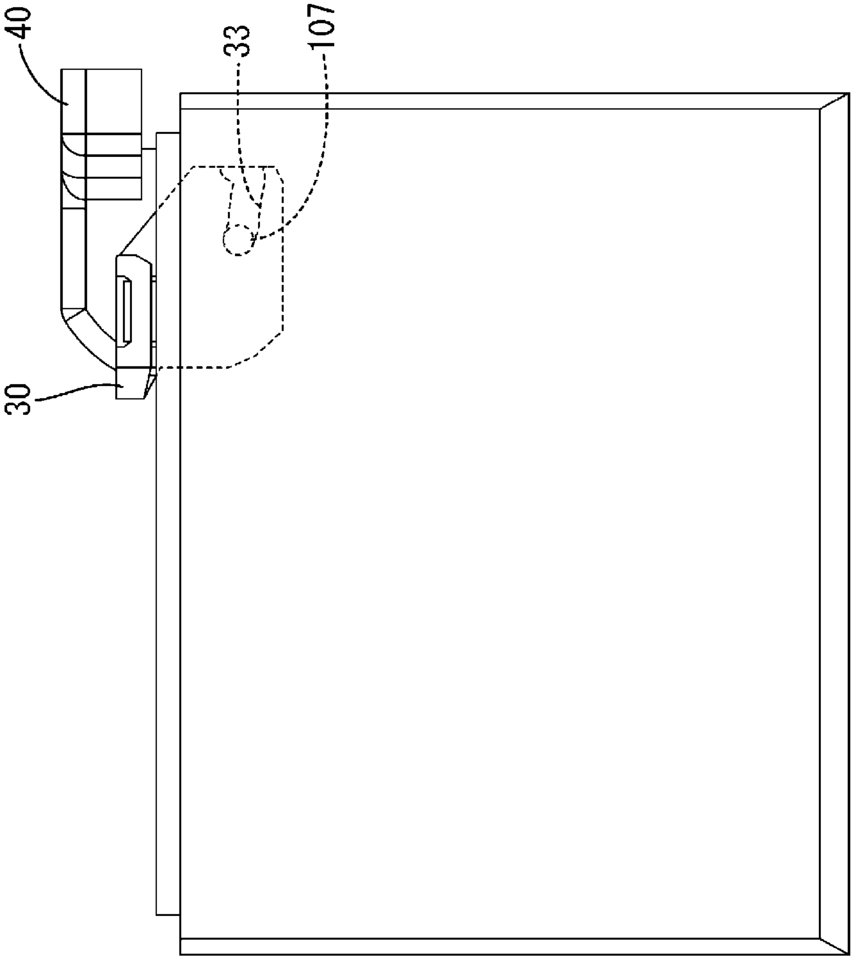
FIG. 20 is a side view depicting a state in which mating of the first housing, to which the lever and the first wire cover have been attached, to the mating connector has been completed according to the first embodiment.

When the covered connector 10 is mated with the mating connector 100, the mating connector 100 becomes pulled toward the housings 11A, 11B, and 11C by the cam action of the cam groove 33 and the cam follower 107 which accompanies rotation of a lever 30 from the mating start position depicted in FIG. 19 to the mating completion position depicted in FIG. 20, which assists the mating operation of the covered connector 10 on the mating connector 100.

First, the first housing 11A on which the first wire cover 40 has been attached is mated with the mating connector 100. In a state where the lever 30 is held at the mating start position, the first housing 11A shallowly enters the mating space 105A that is closest to the front of the mating connector 100. When doing so, as depicted in FIG. 19, the cam follower 107 advances from the cam entrance 33A into the cam groove 33.

Next, the lever 30 is rotated from the mating start position toward the mating completion position. As the lever 30 rotates, the cam follower 107 moves toward the inside of the cam groove 33, and the cam action produced by the engagement between the cam follower 107 and the cam groove 33 relatively pulls the first housing 11A toward the mating connector 100. When the lever 30 reaches the mating completion position, the first housing 11A reaches the regular mating position with respect to the mating connector 100, as depicted in FIG. 20.

Next, the second housing 11B on which the second wire cover 60 has been attached is mated to the mating connector 100 in the same way. After that, the third housing 11C on which the third wire cover 80 has been attached is mated to the mating connector 100 in the same way.

In a state where the attachment of the covered connector 10 to the mating connector 100 has been completed, as depicted in FIGS. 21, 22, and 23, the first wire cover 40, the second wire cover 60, and the third wire cover 80 become disposed in a line in that order from the front.

The first wire cover 40 is disposed with the first wire exit port 57 facing the front, and the first wires 20A extend toward the front from the first wire exit port 57.

The second wire cover 60 is disposed with the second wire exit port 76 facing the front, the second cover main body 61 is positioned behind the first cover main body 41, and the second wire restricting portion 71 is positioned behind the first wire restricting portion 51. The second wire exit port 76 is displaced with respect to the first wire exit port 57 in a direction away from the mating connector 100 (that is, upward in FIGS. 21 and 23), and is disposed off-center toward the first restricting side wall 53 side of the first wire cover 40 (that is, to the right in FIG. 23). The second electric wires 20B that extend out from the second wire exit port 76 are disposed along the outer surface of the first restricting main wall 52 and extend toward the front.

The third wire cover 80 is disposed with the third wire exit port 96 facing the front, the third cover main body 81 is positioned behind the second cover main body 61, and the third wire restricting portion 91 is positioned behind the second wire restricting portion 71. The third wire exit port 96 is displaced with respect to the first wire exit port 57 in a direction away from the mating connector 100 (that is, upward in FIGS. 21 and 23), and is disposed off-center toward the second restricting side wall 54 side of the first wire cover 40 (that is, to the left in FIG. 23). The third electric wires 20C that extend out from the third wire exit port 96 are disposed along the outer surface of the first restricting main wall 52 and extend toward the front.

In this way, the first wire exit port 57, the second wire exit port 76, and the third wire exit port 96 are all open to the front, that is, in the same direction, so that the first electric wires 20A, the second electric wires 20B and the third electric wires 20C are all led out in the same direction (that is, to the front).

The second wire exit port 76 and the third wire exit port 96 are disposed so as to be displaced with respect to the first wire exit port 57 in the mating direction (or "X-axis direction") in which the first housing 11A, the second housing 11B, and the third housing 11C are mated to the mating connector 100. In more detail, the second wire exit port 76 and the third wire exit port 96 are disposed so as to not overlap the first wire exit port 57 along the mating direction in which the first housing 11A, the second housing 11B, and the third housing 11C are mated to the mating connector 100.

In addition, the second wire exit port 76 and the third wire exit port 96 are disposed so as to be mutually displaced in a direction (or "Z-axis direction") that is perpendicular to both the mating direction (or "X-axis direction") in which the first housing 11A, the second housing 11B, and the third housing 11C are mated to the mating connector 100 and a direction (or "Y-axis direction") in which the first housing 11A, the second housing 11B, and the third housing 11C are aligned. In more detail, the second wire exit port 76 and the third wire exit port 96 are disposed so as to not overlap each other along a direction perpendicular to both the mating direction in which the first housing 11A, the second housing 11B, and the third housing 11C are mated to the mating connector 100 and the direction in which the first housing 11A, the second housing 11B, and the third housing 11C are aligned.

According to this configuration, the first electric wires 20A, the second electric wires 20B, and the third electric wires 20C can all be led out in the same direction while avoiding mutual interference. In addition, compared with the case where the first wire exit port 57, the second wire exit port 76, and the third wire exit port 96 are arranged side by side in a line, the three wire covers 40, 60, and 80 can be laid out more compactly, which enables the electronic unit 1 to be miniaturized. The first electric wires 20A, the second electric wires 20B, and the third electric wires 20C can be prevented from interfering with each other, which means that the electric wires 20A, 20B, and 20C can be routed stably.

Also, the width W11 of the first wire restricting portion 51 is larger than the width W2 of the second wire restricting portion 71 and the width W3 of the third wire restricting portion 91. In more detail, as depicted in FIG. 23, the width W11 of the first wire restricting portion 51 is approximately equal to or slightly smaller than the sum of the width W2 of the second wire restricting portion 71 and the width W3 of the third wire restricting portion 91. According to this configuration, the second electric wires 20B and the third electric wires 20C can be supported by the first restricting main wall 52 of the first wire restricting portion 51, which means that the second electric wires 20B and the third electric wires 20C can be stably routed.

Also, as depicted in FIGS. 22 and 23, the first wire cover 40, the second wire cover 60, and the third wire cover 80 as a whole are entirely disposed between a first virtual plane P1 that includes the outer surface of the first case wall 131 and a second virtual plane P2 that includes the outer surface of the second case wall 132. According to this configuration, the three wire covers 40, 60, and 80 can be compactly laid out, which makes it possible to avoid an increase in the size of the electronic unit 1.

Effects

As described above, according to the first embodiment, the covered connector 10 includes the first housing 11A, the second housing 11B, and the third housing 11C that mate with the mating connector 100, the first electric wires 20A, the second electric wires 20B, and the third electric wires 20C that extend from the first housing 11A, the second housing 11B, and the third housing 11C, respectively, and the first wire cover 40, the second wire cover 60, and the third wire cover 80 that are respectively attached to the first housing 11A, the second housing 11B, and the third housing 11C and cover the first electric wires 20A, the second electric wires 20B, and the third electric wires 20C. The first housing 11A, the second housing 11B, and the third housing 11C are disposed so as to be aligned in that order in a different direction to the mating direction in which the first housing 11A, the second housing 11B, and the third housing 11C are mated to the mating connector 100. The first wire cover 40, the second wire cover 60, and the third wire cover 80 are respectively provided with the first wire exit port 57, the second wire exit port 76, and the third wire exit port 96 that are open in the same direction and through which the first electric wires 20A, the second electric wires 20B, and the third electric wires 20C are led out. The second wire exit port 76 and the third wire exit port 96 are disposed so as to be displaced with respect to the first wire exit port 57 in the mating direction in which the first housing 11A, the second housing 11B, and the third housing 11C are mated to the mating connector 100. The second wire exit port 76 and the third wire exit port 96 are disposed so as to be mutually displaced in a direction that is perpendicular to both the mating direction in which the first housing 11A, the second housing 11B, and the third housing 11C are mated to the mating connector 100 and the direction in which the first housing 11A, the second housing 11B, and the third housing 11C are aligned.

According to this configuration, the first wires 20A, the second wires 20B, and the third wires 20C can all be led out in the same direction while avoiding mutual interference. In addition, the three wire covers 40, 60, and 80 can be laid out compactly compared to when the first wire exit port 57, the second wire exit port 76, and the third wire exit port 96 are arranged side by side in a line, which enables miniaturization.

The first wire cover 40, the second wire cover 60, and the third wire cover 80 include the first wire restricting portion 51, the second wire restricting portion 71, and the third wire restricting portion 91 that are adjacent to the first wire exit port 57, the second wire exit port 76, and the third wire exit port 96, and the width W11 of the first wire restricting portion 51 is wider than the width W2 of the second wire restricting portion 71 and the width W3 of the third wire restricting portion 91.

According to this configuration, the second electric wires 20B and the third electric wires 20C that are led out from the second wire cover 60 and the third wire cover 80 can be supported by the first wire restricting portion 51, which means that the wires 20B and 20C can be stably routed.

The second wire exit port 76 and the third wire exit port 96 are disposed so as to not overlap the first wire exit port 57 along the mating direction in which the first housing 11A, the second housing 11B, and the third housing 11C are mated to the mating connector 100. In addition, the second wire exit port 76 and the third wire exit port 96 are disposed so as to be mutually displaced in a direction that is perpendicular to both the mating direction in which the first housing 11A, the second housing 11B, and the third housing 11C are mated to the mating connector 100 and a direction in which the first housing 11A, the second housing 11B, and the third housing 11C are aligned.

According to this configuration, mutual interference between the wires 20A, 20B, and 20C that are led out from the three wire covers 40, 60, and 80 is avoided and the wires 20A, 20B, and 20C can be stably routed.

The electronic unit 1 according to the present embodiment includes the covered connector 10 and the mating connector 100 with the configuration described above, the circuit board 120 to which the mating connector 100 is fixed, and the case 130 that houses the circuit board 120 and the mating connector 100. The case 130 includes the first case wall 131, the second case wall 132 that faces the first case wall 131, and the third case wall 133 that includes the connector insertion opening 134, through which the mating connector 100 is inserted, and connects the first case wall 131 and the second case wall 132. The first wire cover 40, the second wire cover 60, and the third wire cover 80 are disposed between the first virtual plane P1 including an outer surface of the first case wall 131 and a second virtual plane P2 including an outer surface of the second case wall 132.

According to this configuration, the three wire covers 40, 60, and 80 can be compactly laid out, which makes it possible to avoid an increase in the size of the electronic unit 1.

Second Embodiment

Next, a second embodiment will be described with reference to FIGS. 24 and 25. A connector unit 150 according to the present embodiment is the same as the first embodiment but differs from the first embodiment in the configurations of a first wire cover 151 and a second wire cover 153. In the following description, configurations that are the same as in the first embodiment have been assigned the same reference numerals and description thereof is omitted.

Figure 24:
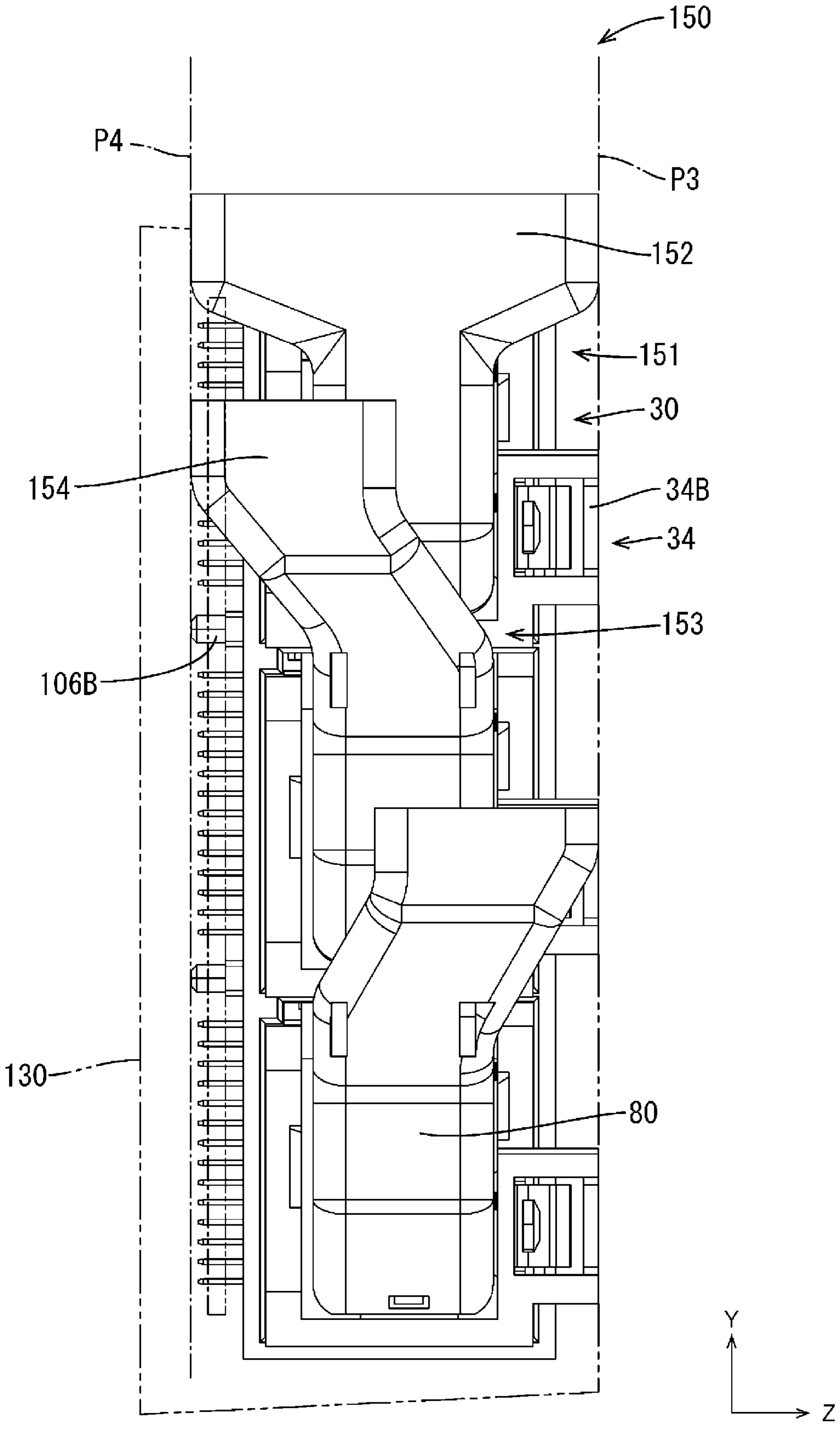
FIG. 24 is a plan view of a connector unit according to a second embodiment.
Figure 25:
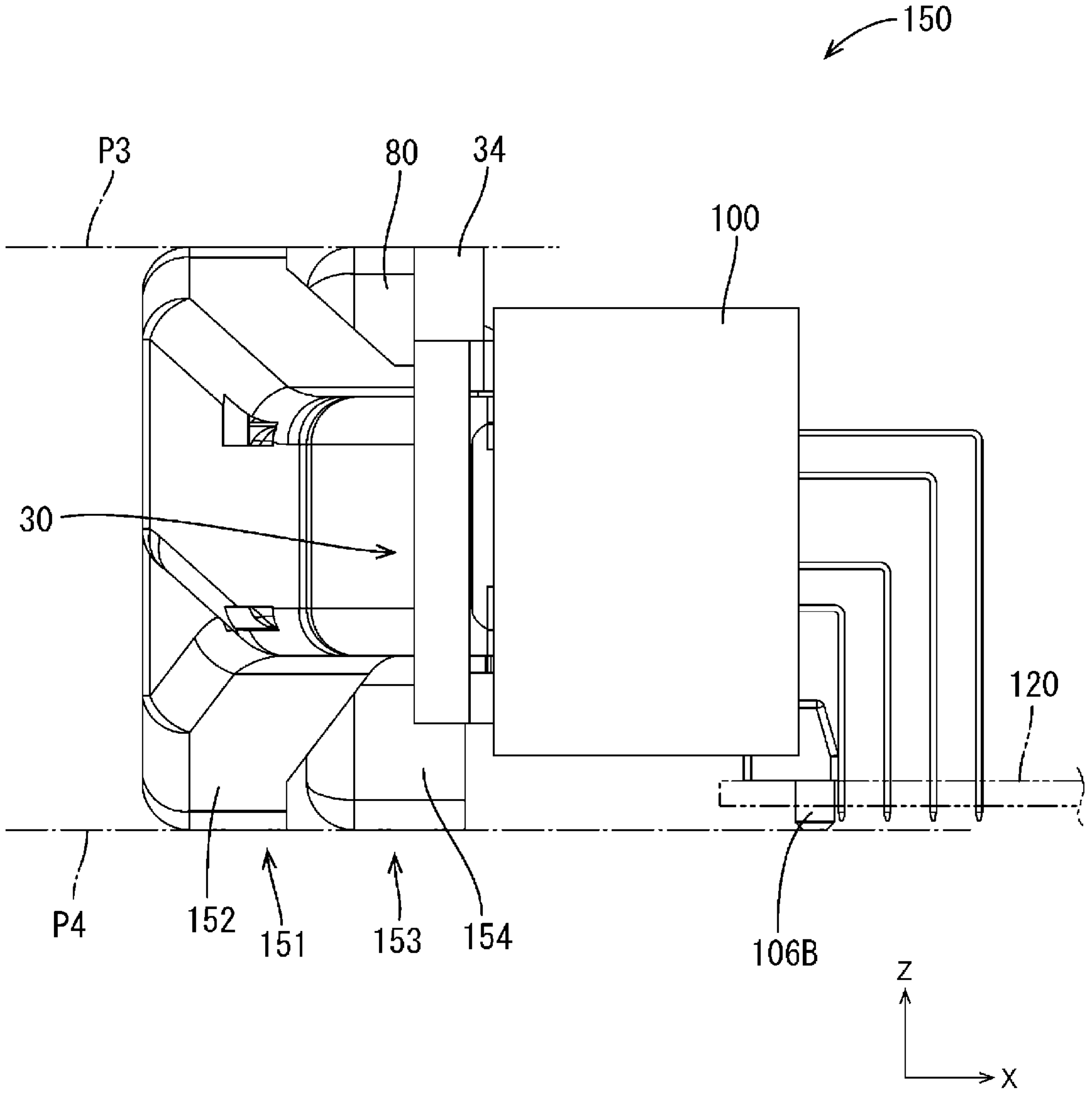
FIG. 25 is a rear view of the connector unit according to the second embodiment.

The first wire cover 151 and the second wire cover 153 have the same configuration as in the first embodiment aside from a first wire restricting portion 152 and a second wire restricting portion 154 extending by a smaller amount than in the first embodiment to one side (the left side in FIG. 24). Since the other configurations are the same as in the first embodiment, the same configurations have been assigned the same reference numerals and description thereof is omitted.

In the connector unit 150, the first wire cover 151, the second wire cover 153, and the third wire cover 80 are disposed between a third virtual plane P3 and a fourth virtual plane P4 that are parallel to the mating direction in which the first housing 11A, the second housing 11B, and the third housing 11C are mated to the mating connector 100 and respectively include one end and the other end that protrude by the greatest amount on respective sides in a direction (or "Z-axis direction") that is perpendicular to both the mating direction (or "X-axis direction") in which the first housing 11A, the second housing 11B, and the third housing 11C are mated to the mating connector 100 and the direction (or "Y-axis direction") in which the first housing 11A, the second housing 11B, and the third housing 11C are aligned. In this second embodiment, the one end is the outer surface of the bridge portion 34B of the rotational operating portion 34 included in each lever 30. The other end is the front end of the fixing protrusion 106B provided on the mating connector 100.

According to this configuration, the three wire covers 40, 60, and 80 can be compactly laid out, which avoids an increase in size of the connector unit 140.

Modifications

Figure 26:
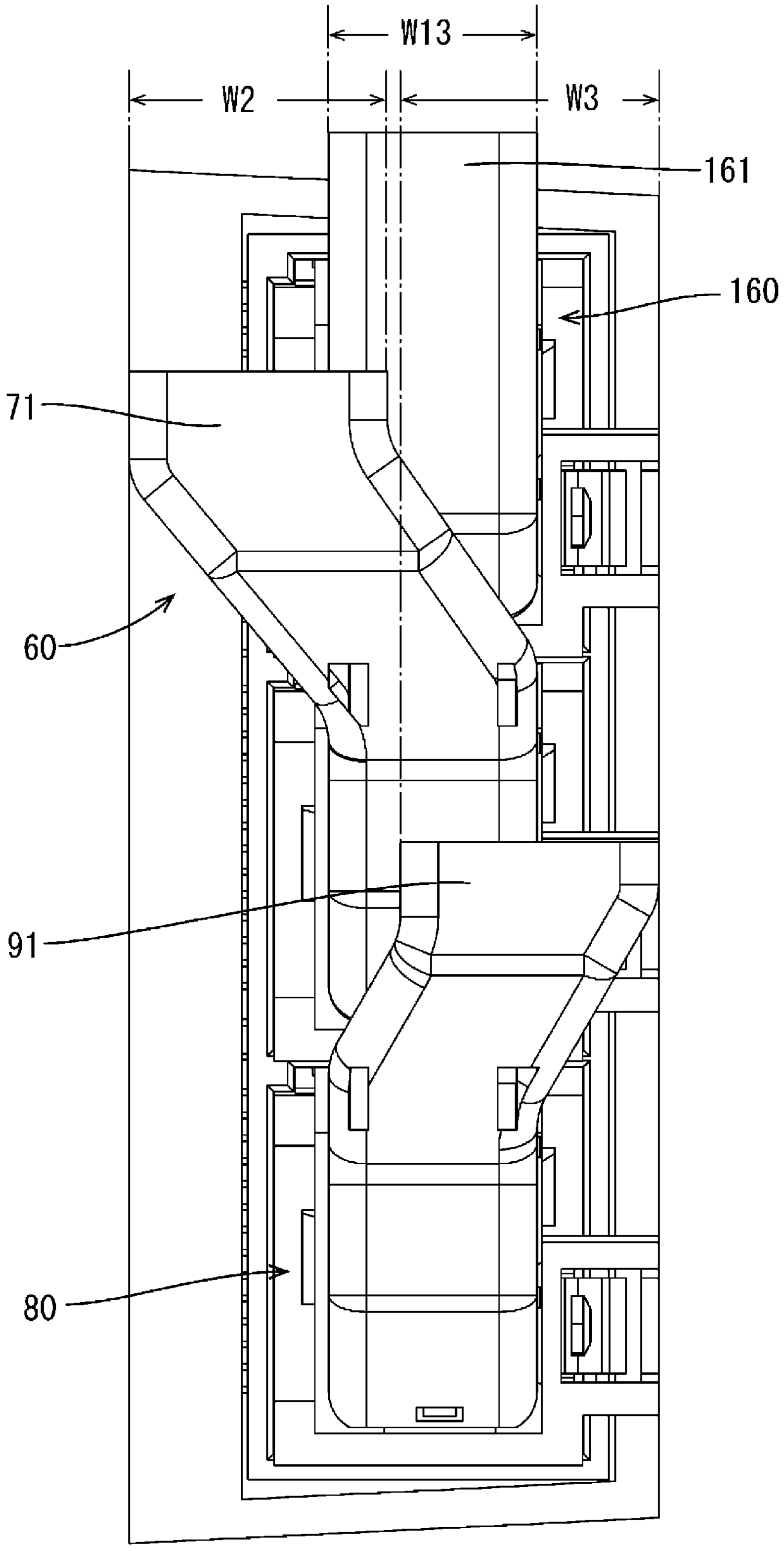
FIG. 26 is a plan view of a modified electronic unit.

Although the width W11 of the first wire restricting portion 51 is wider than the width W2 of the second wire restricting portion 71 and the width W3 of the third wire restricting portion 91 in the first and second embodiments described above, as depicted in FIG. 26, a width W13 of a first wire restricting portion 161 provided on the first wire cover 160 may be similar to the width W2 of the second wire restricting portion 71 and the width W3 of the third wire restricting portion 91. Note that in this modification, since the configurations aside from those described above are the same as in the first embodiment, the same reference numerals have been assigned to the same configurations and description thereof is omitted.

Other Embodiments (1) Although the second wire restricting portion 71 extends diagonally upward to the left in FIG. 22 and the third wire restricting portion 91 extends diagonally upward to the right in FIG. 22 in the first embodiment described above, the directions in which the second wire restricting portion and the third wire restricting portion extend may be reversed in the left-right direction.

(2) In the first embodiment described above, the width W11 is wider than the width W2 of the second wire restricting portion 71 and the width W3 of the third wire restricting portion 91 over substantially the entire first wire restricting portion 51, but a similar effect is obtained if the width of at least part of the first wire restricting portion is wider than the width of the second wire restricting portion and the width of the third wire restricting portion.

LIST OF REFERENCE NUMERALS

1 Electronic unit
10 Covered connector
11A First housing
11B Second housing
11C Third housing
12 Wire holding portion
12A Wire exit surface
12B side attachment surface
12C front attachment surface
12D rear attachment surface
13 Cavity
14 Rotational shaft
15 Attachment recess
15A Inner surface
15B Side surface
16 Attachment hook
17 Stepped portion
18 Cover locking portion
18A First erected wall
18B Locking wall
18C Second erected wall
18D Locking recess
20A First electric wire
20B Second electric wire
20C Third electric wire
30 Lever
31A, 31B Cam plate
32 Shaft hole
33 Cam groove
33A Cam entrance
34 Rotational operating portion
34A Column portion
34B Bridge portion
35 Connecting portion
40, 151, 160 First wire cover
41 First cover main body
42 First cover main wall
43 First cover side wall
44 Attachment hook
45 Attachment hole
46 Locking protrusion
51, 152, 161 First wire restricting portion
52 First restricting main wall
53 First restricting side wall
54 Second restricting side wall
55 First connecting wall
56 Second connecting wall
57 First wire exit port
60, 153 Second wire cover
61 Second cover main body
62 Second cover main wall
63 Second cover side wall
71, 154 Second wire restricting portion
72 Second restricting main wall
73 First inclined wall
74 First extending wall
75 Third restricting side wall
76 Second wire exit port
80 Third wire cover
81 Third cover main body
82 Third cover main wall
83 Third cover side wall

91 Third wire restricting portion
92 Third restricting main wall
93 Second inclined wall
94 Second extending wall
95 Fourth restricting side wall
96 Third wire exit port
100 Mating connector
101 Mating housing
102 Terminal holding wall
103 Hood portion
103A Base wall
103B Facing wall
103C Front wall
103D Rear wall
104 Partition wall
105A, 105B, 105C Mating space
106 Fixing portion
106A Pedestal portion
106B Fixing protrusion
107 Cam follower
111 Male terminal fitting
112 Tab portion
113 Board connecting portion
120 Circuit board
121 Through hole
122 Fixing hole
130 Case
131 First case wall
132 Second case wall
133 Third case wall
134 Connector insertion opening
140, 150 Connector unit
P1 First virtual plane
P2 Second virtual plane
P3 Third virtual plane
P4 Fourth virtual plane
W11, W13 Width of first wire restricting portion
W12 Width of first cover main body
W2 Width of second wire restricting portion
W3 Width of third wire restricting portion

What is claimed is:

1. A covered connector comprising:

a first housing, a second housing, and a third housing that mate with a mating connector;

electric wires that extend from the first housing, the second housing, and the third housing, respectively; and a first wire cover, a second wire cover, and a third wire cover that are respectively attached to the first housing, the second housing, and the third housing, and cover the electric wires, wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, and the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned.

2. The covered connector according to claim 1, wherein the first wire cover, the second wire cover, and the third wire cover include a first wire restricting portion, a second wire restricting portion, and a third wire restricting portion that are adjacent to the first wire exit port, the second wire exit port, and the third wire exit port, and a width of the first wire restricting portion is wider than a width of the second wire restricting portion and a width of the third wire restricting portion.

3. The covered connector according to claim 1, wherein the second wire exit port and the third wire exit port are disposed so as to not overlap the first wire exit port along the mating direction in which the first housing, the second housing, and the third housing are mated to the mating connector.

4. The covered connector according to claim 1, wherein the second wire exit port and the third wire exit port are disposed so as to not overlap each other along a direction that differs to both the mating direction in which the first housing, the second housing, and the third housing are mated to the mating connector and the direction in which the first housing, the second housing, and the third housing are aligned.

5. An electronic unit comprising:

a covered connector including a first housing, a second housing, and a third housing, electric wires that extend from the first housing, the second housing, and the third housing, respectively, and a first wire cover, a second wire cover, and a third wire cover that are respectively attached to the first housing, the second housing, and the third housing, and cover the electric wires;

a mating connector to which the first housing, the second housing, and the third housing are mated;

a circuit board to which the mating connector is fixed; and a case that internally houses the circuit board and the mating connector, wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned, the case includes a first case wall, a second case wall that faces the first case wall, and a third case wall that includes a connector insertion opening, through which the mating connector is inserted, and connects the first case wall and the second case wall, and the first wire cover, the second wire cover, and the third wire cover are disposed between a first virtual plane including an outer surface of the first case wall and a second virtual plane including an outer surface of the second case wall.

6. A connector unit comprising:

a covered connector including a first housing, a second housing, and a third housing, electric wires that extend from the first housing, the second housing, and the third housing, respectively, and a first wire cover, a second wire cover, and a third wire cover that are respectively attached to the first housing, the second housing, and the third housing, and cover the electric wires; and a mating connector to which the first housing, the second housing, and the third housing are mated;

wherein the first housing, the second housing, and the third housing are disposed so as to be aligned in that order in a different direction to a mating direction in which the first housing, the second housing, and the third housing are mated to the mating connector, the first wire cover, the second wire cover, and the third wire cover are respectively provided with a first wire exit port, a second wire exit port, and a third wire exit port that are open in a same direction and through which the electric wires are led out, the second wire exit port and the third wire exit port are disposed so as to be displaced with respect to the first wire exit port in the mating direction in which the first housing, the second housing, and the third housing are mated to the mating connector, the second wire exit port and the third wire exit port are disposed so as to be mutually displaced in a different direction to both the mating direction in which the first housing, the second housing, and the third housing are mated to the mating connector and a direction in which the first housing, the second housing, and the third housing are aligned, and the first wire cover, the second wire cover, and the third wire cover are disposed between a third virtual plane and a fourth virtual plane, which are parallel to the mating direction in which the first housing, the second housing, and the third housing are mated to the mating connector and which respectively include a first end and a second end that protrude by a greatest amount on respective sides in a direction that differs to both the mating direction in which the first housing, the second housing, and the third housing are mated to the mating connector and the direction in which the first housing, the second housing, and the third housing are aligned.

* * * * *